(12) United States Patent
Mahany

(10) Patent No.: US 7,710,907 B2
(45) Date of Patent: *May 4, 2010

(54) LOCAL AREA NETWORK HAVING MULTIPLE CHANNEL WIRELESS ACCESS

(75) Inventor: Ronald L. Mahany, Cedar Rapids, IA (US)

(73) Assignee: Broadcom Corporation, Irvine, CA (US)

( * ) Notice: Subject to any disclaimer, the term of this patent is extended or adjusted under 35 U.S.C. 154(b) by 766 days.

This patent is subject to a terminal disclaimer.

(21) Appl. No.: 11/496,950

(22) Filed: Aug. 1, 2006

(65) Prior Publication Data

US 2006/0270338 A1    Nov. 30, 2006

Related U.S. Application Data

(60) Division of application No. 10/648,707, filed on Aug. 26, 2003, now Pat. No. 7,107,052, which is a continuation of application No. 09/357,429, filed on Jul. 20, 1999, now Pat. No. 6,665,536, which is a continuation of application No. 08/878,357, filed on Jun. 27, 1997, now Pat. No. 5,960,344, which is a continuation-in-part of application No. 08/772,895, filed on Dec. 24, 1996, now abandoned, which is a continuation-in-part of application No. 08/696,086, filed on Aug. 13, 1996, now abandoned, which is a continuation of application No. 08/238,180, filed on May 4, 1994, now Pat. No. 5,546,397, which is a continuation-in-part of application No. 08/197,392, filed on Feb. 16, 1994, now abandoned, which is a continuation-in-part of application No. 08/170,121, filed on Dec. 20, 1993, now abandoned.

(30) Foreign Application Priority Data

Jun. 3, 1996   (WO) ................. PCT/US96/09474

(51) Int. Cl.
*H04B 7/00*    (2006.01)

(52) U.S. Cl. .............. 370/310.2; 370/328; 370/338; 370/401; 455/41.2; 455/432.1

(58) Field of Classification Search ............. 370/310.1, 370/338, 401, 466; 455/3.01, 41.2, 432.1, 455/517; 375/240

See application file for complete search history.

(56) References Cited

U.S. PATENT DOCUMENTS 3,665,164 A    5/1972   Beveridge (Continued)

FOREIGN PATENT DOCUMENTS

EP    0194115    9/1986

(Continued)

OTHER PUBLICATIONS

PCMCIA Primer, John Reimer, pp. 66-67, 1995.

(Continued)

*Primary Examiner*—Sharad Rampuria
(74) *Attorney, Agent, or Firm*—McAndrews, Held & Malloy, Ltd.

(57) ABSTRACT

A communication network having at least one access point supports wireless communication among a plurality of wireless roaming devices via a first and a second wireless channel. The access point comprises a first and a second transceiver. The first and second transceivers operate on the first and second wireless channels, respectively. Each of the plurality of wireless roaming devices are capable of communicating on the first and second wireless channel. In one embodiment, the first wireless channel is used to exchange data, while the second channel is used to manage such exchanges as well as access to the first channel. In an alternate embodiment, both channels are used to support communication flow, however the first channel supports a protocol that is more deterministic than that of the second channel. Allocation of ones of the plurality of wireless roaming devices from one channel to the next may occur per direction from the access point. It may also result from decisions made by each of the wireless roaming devices made independent of the access point. For example, a decision may be made based on the data type being transferred or based on the current channel load. Such factors may also be used by the access point for allocation determinations. In addition, allocation may be based on the type of roaming device involved, such as allocating peripherals to a slower channel.

50 Claims, 17 Drawing Sheets

U.S. PATENT DOCUMENTS

| | | |
|---|---|---|
| D230,859 S | 3/1974 | Kurosu |
| 3,826,900 A | 7/1974 | Moellering |
| 3,947,817 A | 3/1976 | Requa |
| 3,976,973 A | 8/1976 | Martin et al. |
| 4,002,892 A | 1/1977 | Zielinski |
| 4,005,400 A | 1/1977 | Engdahl |
| 4,017,725 A | 4/1977 | Roen |
| 4,020,527 A | 5/1977 | O'Neill |
| 4,058,838 A | 11/1977 | Crager et al. |
| 4,091,270 A | 5/1978 | Musch et al. |
| 4,115,870 A | 9/1978 | Lowell |
| 4,133,034 A | 1/1979 | Etter |
| 4,136,821 A | 1/1979 | Sugiura et al. |
| 4,141,492 A | 2/1979 | Michel et al. |
| 4,158,130 A | 6/1979 | Speraw et al. |
| 4,158,194 A | 6/1979 | McWaters et al. |
| 4,165,554 A | 8/1979 | Faget |
| 4,188,103 A | 2/1980 | Biber et al. |
| 4,210,802 A | 7/1980 | Sakai |
| 4,247,908 A | 1/1981 | Lockhart, Jr. et al. |
| 4,277,837 A | 7/1981 | Stuckert |
| 4,282,425 A | 8/1981 | Chadima, Jr. et al. |
| 4,322,612 A | 3/1982 | Lange |
| 4,385,285 A | 5/1983 | Horst et al. |
| 4,414,661 A | 11/1983 | Karlstrom |
| 4,415,065 A | 11/1983 | Sandstedt |
| 4,418,277 A | 11/1983 | Tremmel et al. |
| 4,422,745 A | 12/1983 | Hopson |
| 4,423,319 A | 12/1983 | Jacobsen |
| 4,460,120 A | 7/1984 | Shepard et al. |
| 4,488,679 A | 12/1984 | Bockholt et al. |
| 4,500,776 A | 2/1985 | Laser |
| 4,506,344 A | 3/1985 | Hubbard |
| 4,511,970 A | 4/1985 | Okano et al. |
| 4,519,068 A | 5/1985 | Krebs et al. |
| 4,523,087 A | 6/1985 | Benton |
| 4,523,297 A | 6/1985 | Ugon et al. |
| 4,569,421 A | 2/1986 | Sandstedt |
| 4,570,057 A | 2/1986 | Chadima, Jr. et al. |
| 4,578,571 A | 3/1986 | Williams |
| 4,603,262 A | 7/1986 | Eastman et al. |
| 4,621,189 A | 11/1986 | Kumar et al. |
| 4,627,736 A | 12/1986 | Komaki |
| 4,628,193 A | 12/1986 | Blum |
| 4,634,845 A | 1/1987 | Hale et al. |
| 4,641,292 A | 2/1987 | Tunnell et al. |
| 4,654,818 A | 3/1987 | Wetterau, Jr. |
| 4,661,993 A | 4/1987 | Leland et al. |
| 4,689,761 A | 8/1987 | Yurchenco |
| 4,703,161 A | 10/1987 | McLean |
| 4,706,096 A | 11/1987 | Sato |
| 4,718,103 A | 1/1988 | Shojima et al. |
| 4,718,110 A | 1/1988 | Schaefer |
| 4,727,245 A | 2/1988 | Dobbins et al. |
| 4,734,566 A | 3/1988 | Senda et al. |
| D295,411 S | 4/1988 | Cho et al. |
| 4,743,773 A | 5/1988 | Katana et al. |
| 4,749,353 A | 6/1988 | Breedlove |
| 4,752,965 A | 6/1988 | Dunkley |
| 4,758,717 A | 7/1988 | Shepard et al. |
| 4,760,248 A | 7/1988 | Swartz et al. |
| 4,761,822 A | 8/1988 | Maile |
| 4,766,300 A | 8/1988 | Chadima, Jr. et al. |
| 4,768,230 A | 8/1988 | Viebrantz et al. |
| 4,773,032 A | 9/1988 | Uehara |
| 4,793,812 A | 12/1988 | Sussman et al. |
| D299,234 S | 1/1989 | Kajita |
| 4,825,057 A | 4/1989 | Swartz |
| 4,831,275 A | 5/1989 | Drucker |
| 4,835,372 A | 5/1989 | Gombrich |
| 4,836,256 A | 6/1989 | Meliconi |
| 4,837,858 A | 6/1989 | Ablay et al. |
| 4,842,966 A | 6/1989 | Omori et al. |
| 4,845,350 A | 7/1989 | Shepard et al. |
| 4,850,009 A | 7/1989 | Zook et al. |
| D303,112 S | 8/1989 | Desrochers |
| 4,857,716 A | 8/1989 | Gombrich et al. |
| 4,866,646 A | 9/1989 | Nakamura et al. |
| 4,877,949 A | 10/1989 | Danielson et al. |
| 4,881,839 A | 11/1989 | Grimm |
| 4,890,832 A | 1/1990 | Komaki |
| 4,897,532 A | 1/1990 | Swartz et al. |
| 4,910,775 A | 3/1990 | Yves et al. |
| 4,916,441 A | 4/1990 | Gombrich |
| 4,940,974 A | 7/1990 | Sojka |
| 4,942,356 A | 7/1990 | Ellingen et al. |
| 4,953,113 A | 8/1990 | Chadima, Jr. et al. |
| 4,967,188 A | 10/1990 | Collins |
| 4,972,496 A | 11/1990 | Sklarew |
| 4,983,818 A | 1/1991 | Knowles |
| 4,984,247 A | 1/1991 | Kaufmann et al. |
| 5,002,184 A | 3/1991 | Lloyd |
| 5,008,879 A | 4/1991 | Fischer et al. |
| 5,012,407 A | 4/1991 | Finn |
| 5,023,824 A | 6/1991 | Chadima, Jr. et al. |
| 5,029,181 A | 7/1991 | Endo et al. |
| 5,046,066 A | 9/1991 | Messenger |
| 5,046,130 A | 9/1991 | Hall et al. |
| 5,049,862 A | 9/1991 | Dao et al. |
| 5,049,863 A | 9/1991 | Oka |
| 5,057,676 A | 10/1991 | Komaki |
| 5,059,778 A | 10/1991 | Zouzoulas et al. |
| 5,070,536 A | 12/1991 | Mahany et al. |
| 5,097,484 A | 3/1992 | Akaiwa |
| 5,101,406 A | 3/1992 | Messenger et al. |
| 5,117,501 A | 5/1992 | Childress et al. |
| 5,142,534 A | 8/1992 | Simpson et al. |
| 5,164,942 A | 11/1992 | Kamerman et al. |
| 5,181,200 A | 1/1993 | Harrison |
| 5,202,817 A | 4/1993 | Koenck et al. |
| 5,216,233 A | 6/1993 | Main et al. |
| 5,218,187 A | 6/1993 | Koenck et al. |
| 5,227,614 A | 7/1993 | Danielson et al. |
| 5,268,933 A | 12/1993 | Averbuch |
| 5,291,516 A | 3/1994 | Dixon et al. |
| 5,295,154 A * | 3/1994 | Meier et al. ............ 370/351 |
| 5,297,144 A | 3/1994 | Gilbert et al. |
| 5,321,542 A | 6/1994 | Freitas et al. |
| 5,339,316 A * | 8/1994 | Diepstraten ............ 370/401 |
| 5,363,401 A | 11/1994 | Lucas et al. |
| 5,363,402 A | 11/1994 | Harmon et al. |
| 5,390,166 A | 2/1995 | Rohani et al. |
| 5,390,206 A | 2/1995 | Rein et al. |
| 5,404,375 A | 4/1995 | Kroeger et al. |
| 5,410,141 A | 4/1995 | Koenck et al. |
| 5,410,740 A | 4/1995 | Hagstrom |
| 5,410,752 A | 4/1995 | Scholefield |
| 5,465,392 A * | 11/1995 | Baptist et al. ............ 370/310 |
| 5,469,468 A | 11/1995 | Schilling |
| 5,490,139 A * | 2/1996 | Baker et al. ............ 370/312 |
| 5,513,184 A | 4/1996 | Vannucci |
| 5,546,397 A | 8/1996 | Mahany |
| 5,551,060 A | 8/1996 | Fujii et al. |
| 5,561,845 A | 10/1996 | Bendixen et al. |
| 5,594,731 A * | 1/1997 | Reissner ............ 370/338 |
| 5,644,576 A | 7/1997 | Bauchot et al. |
| 5,655,219 A | 8/1997 | Jusa et al. |
| 5,726,984 A * | 3/1998 | Kubler et al. ............ 370/349 |
| 5,734,645 A | 3/1998 | Raith et al. |
| 5,748,621 A | 5/1998 | Masuda et al. |
| 5,768,267 A | 6/1998 | Raith et al. |
| 5,790,587 A | 8/1998 | Smith et al. |
| 5,844,893 A | 12/1998 | Gollnick et al. |
| 5,901,362 A * | 5/1999 | Cheung et al. ............ 455/525 |

| | | | |
|---|---|---|---|
| 5,960,344 A | 9/1999 | Mahany | |
| 6,006,090 A * | 12/1999 | Coleman et al. | 455/432.1 |
| 6,118,824 A | 9/2000 | Smith et al. | |
| 6,138,010 A | 10/2000 | Rabe et al. | |
| 6,185,205 B1 | 2/2001 | Sharrit et al. | |
| 6,201,962 B1 * | 3/2001 | Sturniolo et al. | 455/432.2 |
| 6,298,047 B1 * | 10/2001 | Steffes et al. | 370/310 |
| 6,665,536 B1 | 12/2003 | Mahany | |
| 6,795,421 B1 * | 9/2004 | Heinonen et al. | 370/338 |
| 6,947,483 B2 * | 9/2005 | Engwer | 375/240 |
| 6,954,616 B2 * | 10/2005 | Liang et al. | 455/63.1 |
| 6,961,575 B2 * | 11/2005 | Stanforth | 455/445 |
| 7,013,138 B2 * | 3/2006 | Mahany | 370/338 |
| 7,136,361 B2 * | 11/2006 | Benveniste | 370/310.2 |
| 7,170,882 B2 * | 1/2007 | Karaoguz et al. | 370/338 |
| 7,209,468 B2 * | 4/2007 | Twitchell, Jr. | 370/338 |
| 7,277,420 B2 * | 10/2007 | Chou et al. | 370/350 |
| 7,283,048 B2 * | 10/2007 | Stilp | 340/539.21 |
| 7,379,447 B2 * | 5/2008 | Dunagan et al. | 370/350 |
| 7,420,952 B2 * | 9/2008 | da Costa et al. | 370/338 |
| 7,471,651 B2 * | 12/2008 | Mahany et al. | 370/310 |
| 2004/0202141 A1 * | 10/2004 | Sinivaara et al. | 370/338 |

FOREIGN PATENT DOCUMENTS

| | | |
|---|---|---|
| EP | 0262943 | 4/1988 |
| FR | 2389938 | 1/1979 |
| GB | 1572962 | 8/1980 |
| GB | 2201125 | 8/1988 |
| JP | 58176792 | 10/1983 |
| JP | 58-211261 | 12/1983 |
| JP | 2-144681 | 6/1990 |
| WO | WO 8700659 | 1/1987 |
| WO | WO 8707106 | 11/1987 |

OTHER PUBLICATIONS

PCMCIA (IC) Cards, vol. 13, No. 8.
News Release "Norand Introduces Enhanced Wireless LAN Capabilities", May 16, 1995, by Norand Corporation, Cedar Rapids, Iowa, pp. 1-4.
News Release "Ositech Communications Inc. Will Release Next Month the Jack of Diamonds, A Type II PC Card", dated May 31, 1995.
Roger C. Alford, "The PCMCIA Redefines Portability", Under the Hood, 1995.
Gary Legg, "Special Components Simplified Interface to PCMCIA Cards", Jun. 10, 1993 EN., pp. 61, 63-64, 66 and 68.
Carole Patton, Radio Transceiver Circuit Card Acts as Wireless Modem in PCs, Info World, Mar. 28, 1988, p. 18.
John R. Gyorki, "New Deal for Smart Cards", Machine Design, Jun. 1, 1993, p. 38-40, 42 and 44.

* cited by examiner

LOCAL AREA NETWORK HAVING MULTIPLE CHANNEL WIRELESS ACCESS

CROSS-REFERENCE TO RELATED APPLICATIONS

The present application is a division of U.S. application Ser. No. 10/648,707, filed Aug. 26, 2003, now U.S. Pat. No. 7,107,052, which is a continuation of U.S. application Ser. No. 09/357,429, filed Jul. 20, 1999, now U.S. Pat. No. 6,665,536, which is a continuation of U.S. application Ser. No. 08/878,357 filed Jun. 27, 1997, now U.S. Pat. No. 5,960,344, which is a continuation-in-part of U.S. application Ser. No. 08/772,895 filed Dec. 24, 1996, abandoned, which is a continuation-in-part of U.S. application Ser. No. 08/696,086 filed Aug. 13, 1996, abandoned, which is a continuation of U.S. application Ser. No. 08/238,180 filed May 4, 1994, now U.S. Pat. No. 5,546,397, which is a continuation-in-part of U.S. application Ser. No. 08/197,392 filed Feb. 16, 1994, abandoned, which is a continuation-in-part of U.S. application Ser. No. 08/170,121 filed Dec. 20, 1993, abandoned.

The U.S. application Ser. No. 08/772,895 filed Dec. 24, 1996, also claims priority to PCT Application Ser. No. PCT/US96/09474 filed Jun. 3, 1996.

The present application is also related to U.S. application Ser. No. 11/497,499, filed Aug. 1, 2006, titled "LOCAL AREA NETWORK HAVING MULTIPLE CHANNEL WIRELESS ACCESS".

All of the aforementioned applications are hereby incorporated herein by reference in their entirety. In addition, U.S. Pat. No. 5,425,051 issued Jun. 13, 1995 to Ronald L. Mahany is also hereby incorporated herein by reference in its entirety.

BACKGROUND

1. Technical Field

The present invention relates generally to access points used in wireless local area networks, and more specifically to an access point which includes multiple wireless adapters.

2. Related Art

Wireless local area networks (WLAN's) use radio frequency transmissions to communicate between roaming computer devices and access points (or base stations). The access points are connected to an infrastructure that electronically connects all of the access points to a host system. The wired infrastructure and the access points make up an information distribution network used for the transfer of information and for communications.

In a wireless networking environment, various types of devices may need to communicate within a given area. When incompatibilities between device types arise, the wireless infrastructure must accommodate the various device types. Accommodating the different device types in a single infrastructure is generally difficult to accomplish. Further, devices within the wireless networking environment typically communicate differing types of data, each with its own priority and bandwidth requirements. Accommodating the various types of data with their related priorities often could not be accomplished by prior devices due to bandwidth limitations, conflicting priorities and incompatible standards within the wireless network.

In prior WLANs, a first wireless terminal that desired to communicate with a base station often could not detect transmissions from a second wireless terminal currently engaged in ongoing communication with the access point. As a result, the wireless terminal often initiated transmissions that collided with the ongoing communications. Operation of this type is referred to as a "hidden terminal" situation. To solve the hidden terminal situation, some prior base stations were configured with a second transmitter for delivering a carrier signal on a "busy channel" whenever the base station was engaged in communication on the "data channel." All terminals were also fitted with a second receiver, tuned to the busy channel, and required to check the busy channel before initiating communication on the data channel. However, the additional power required, bandwidth used, hardware needed and associated cost made the busy channel solution undesirable for most applications.

Some prior WLANs attempted to solve operational difficulties by simply increasing the transmission capacity available on the infrastructure. Such expansion temporarily decreased conflicts in operation of the WLANs. However, the infrastructure, which is expensive to install, typically became overloaded quickly resulting in the same or similar problems.

SUMMARY OF THE INVENTION

The present invention is directed to communication network that supports communication within a premises. The communication network comprises an access point, a plurality of wireless roaming devices, a first wireless communication channel, and a second wireless communication channel. The access point itself comprises a first processing circuit, a first radio transceiver coupled to the first processing circuit, and a second radio transceiver coupled to the first processing circuit. Each of the plurality of wireless roaming devices comprising a second processing circuit, a third radio transceiver and a radio receiver. Therein, the first wireless communication channel that supports communication flow via the communication network, while the second wireless communication channel is used to manage the flow of communication through the first wireless communication channel. In addition, the first and third radio transceivers are operable on the first wireless communication channel, while the second radio transceiver and the radio receiver are operable on the second wireless communication channel.

The communication network also supports various other aspects of the present invention. For example, the access point may further comprise a wired communication interface circuit coupled to the first processing circuit. Selective participation on the first and second communication channels may also provide further benefits. In one embodiment, each of the plurality of wireless roaming devices utilizes the radio receiver on the second wireless communication channel before participating with the third radio transceiver on the first wireless communication channel. In another, each utilizes the radio receiver on the second wireless communication channel to gain access with the third radio transceiver on the first wireless communication channel. Each may also or alternatively utilize the second wireless communication channel to identify ongoing communication on the first wireless communication channel to, perhaps, provide an indication as to when channel capacity may become available.

Other aspects may be found in an alternate communication network which also supports communication within a premises. This communication network comprises an access point, first and second wireless communication channels and plurality of wireless roaming devices. The first wireless communication channel has first communication flow characteristics, while the second wireless communication channel has second communication flow characteristics. The first and second radio transceivers participate on the first and second wireless communication channels, respectively. Therein, each of the plurality of wireless roaming devices comprises a second processing circuit and means for selectively participating on the first and second wireless communication channels.

The access point may also comprise a wired communication interface circuit coupled to the first processing circuit that may itself comprise a first and a second microprocessor. Additionally, at least one of the plurality of wireless roaming devices may participate on the first wireless communication channel while the other of the plurality of wireless roaming devices participates on the second wireless communication channel. Although the at least one of the plurality of wireless roaming devices may participate on the first wireless communication channel as directed by the access device, other variations and combinations are also possible. For example, at least one of the plurality of wireless roaming devices may participate on the first wireless communication channel to exchange a specific type of data, and/or may participate based on current channel conditions. Such participation may be based the fact that, in some embodiments, the second wireless communication channel is more deterministic than the first wireless communication channel.

In any of the aforementioned embodiment, the communication network may comprise at least a second access point. Other variations and aspects of the present invention will become apparent to ones of ordinary skill in the art after reviewing the entire specification and drawings.

DETAILED DESCRIPTION

Figure 1:
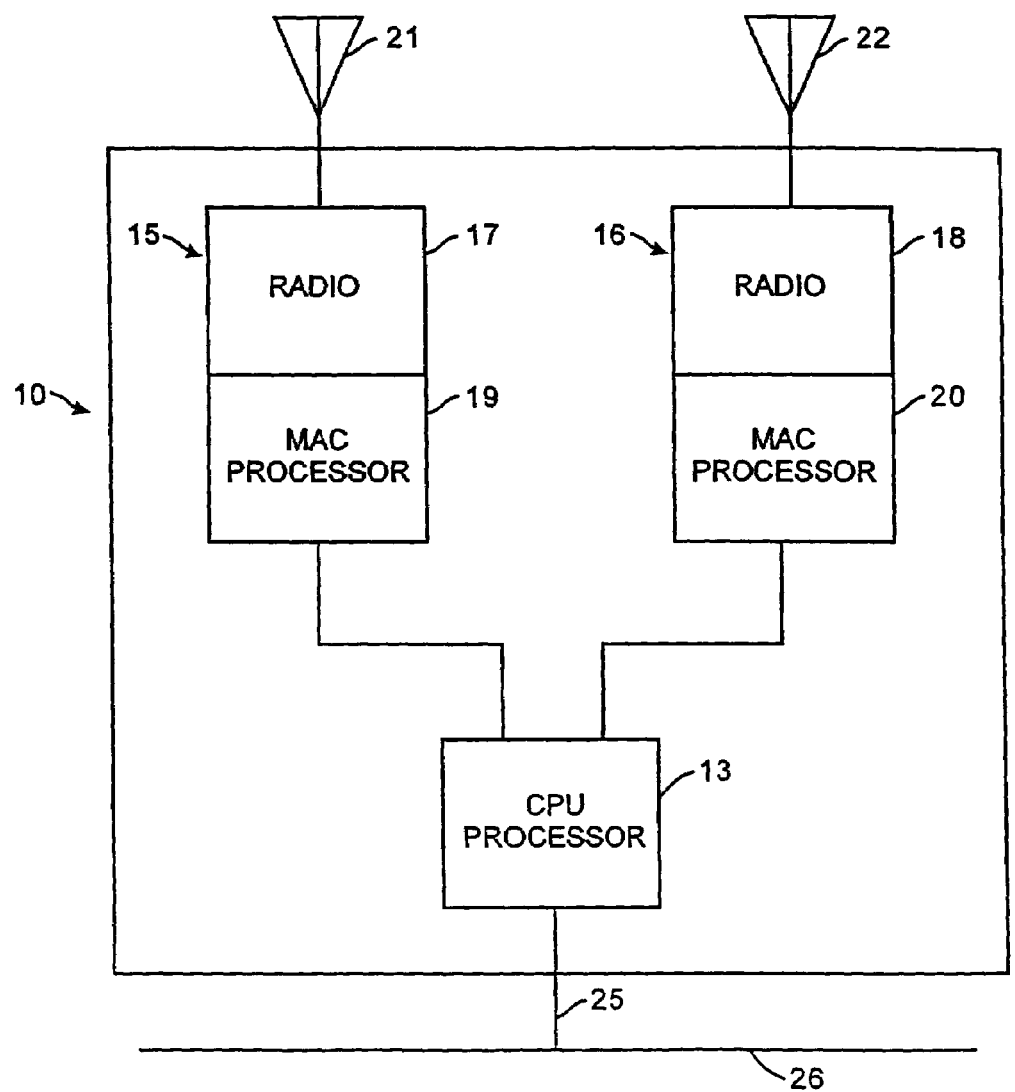
FIG. 1 is a schematic representation of a high reliability access point in accordance with the present invention.

Referring now to the drawings wherein like reference numerals designate identical or corresponding parts throughout the several views, FIG. 1 shows a high reliability access point 10 built in accordance with the present invention. An access point is a base station on a wireless local area network with which roaming portable or mobile computer devices can connect and communicate. The access point is typically part of an overall distribution network which is connected to a host computer or entire computer local area network (LAN). The access points and the infrastructure make up the distribution network and allow for communications between the roaming computer devices and the host computer or entire computer local area network (LAN).

A high reliability access point 10 of the present invention includes a central processing unit CPU processor 13 and at least two wireless adapters 15 and 16. Each of the wireless adapters 15 and 16 include a radio 17 and 18, a media access control (MAC) processor 19 and 20 and an antenna 21 and 22, respectively. The radios and antennas are used for RF transmission and reception. The MAC processor controls low level protocol functions including controlling the operation of the radio, radio channel, error control, e.g., ARQ or Selective Response, and communication with the CPU processor 13. The CPU processor 13 controls the high-level communications protocol functions and controls the interface 25 between the high reliability access point 10 and the infrastructure 26. In a preferred embodiment there is a PCMCIA standard interface between the wireless adapters and the access point.

The distribution network is comprised of all of the access points and the infrastructure which connects all of the access points. A host computer or an entire host network is connected to the distribution network. The distribution network allows computer devices to communicate with the host computer or host network.

The division between what is high level protocol, and thus handled by the CPU processor, and what is low level protocol and thus handled by the MAC processor, can vary greatly depending upon the intelligence level of the MAC processor. In a preferred embodiment, the infrastructure conforms to an industry standard wired LAN such as Ethernet. The MAC processor can be made very intelligent and therefore capable of handling a great deal of radio specific protocol. On the other hand, the MAC processor can be minimally intelligent and handle only the most basic protocol functions allowing the CPU processor to handle the majority of the protocol functions.

Utilizing multiple wireless adapters in a single access point, as well as incorporating independent intelligence and low level protocol responsibility into each wireless adapter, yields several significant advantages. The examples depicted in FIGS. 1-4 show access points using only two wireless adapters per access point. Utilizing two wireless adapters in the manner discussed below will greatly increase the reliability of a particular access point, as well as increase the reliability of the entire distribution network. Access points could use more than two wireless adapters and the utilization of the multiple wireless adapters would be similar to the implementation describes using only two wireless adapters with addition protocol being required to handle the increased redundancy and to allow for more sophisticated self monitoring.

Referring still to FIG. 1, the CPU processor 13 can designate the RF address to which each wireless adapter 15 and 16 is to respond. The CPU processor 13 can, but need not, assign the same address to each wireless adapter. Therefore, in one configuration, the CPU processor 13 can designate that each of the wireless adapters 15 and 16 respond to the address assigned to that access point 10. Designated as such, both radios 17 and 18 will be operating simultaneously on the same channel. In a frequency hopping system, both radios 17 and 18 would be operating on the same hopping sequence, and be mutually synchronized to that hopping sequence.

Accordingly, the wireless adapters 15 and 16 are configured to receive incoming transmission from roaming computer devices within range. As both wireless adapters 15 and 16 receive the transmission, each adapter can evaluate the quality information to the CPU processor 13. The CPU processor 13 uses the quality information to determine which wireless adapter is receiving the higher quality signal. The CPU processor 13 will then typically choose to receive the incoming transmission on the wireless adapter with the higher signal quality and respond using the same adapter.

The antennas 21 and 22 can be positioned to allow the access point 10 to implement an antenna diversity scheme which will help reduce the negative effects caused by multipath interference. Antenna diversity can be accomplished in various ways. For example, the antennas can be placed sufficiently far apart, typically greater than a quarter wavelength apart, or the antennas can be positioned at a 90 degree angle with respect to each other to create a polarization antenna diversity scheme.

With an antenna diversity scheme in place, the signal from a wireless computer device will be received differently on each antenna due to multipath signal propagation. Therefore, each wireless adapter may receive a signal of a different quality. The CPU processor 13 can choose which wireless adapter to use based upon the quality of the received signal. Each wireless adapter includes the capability of measuring signal quality and only good messages will be forwarded on to the CPU processor 13. The quality can be appended to the message or can be presented to the CPU in a memory register.

Figure 2:
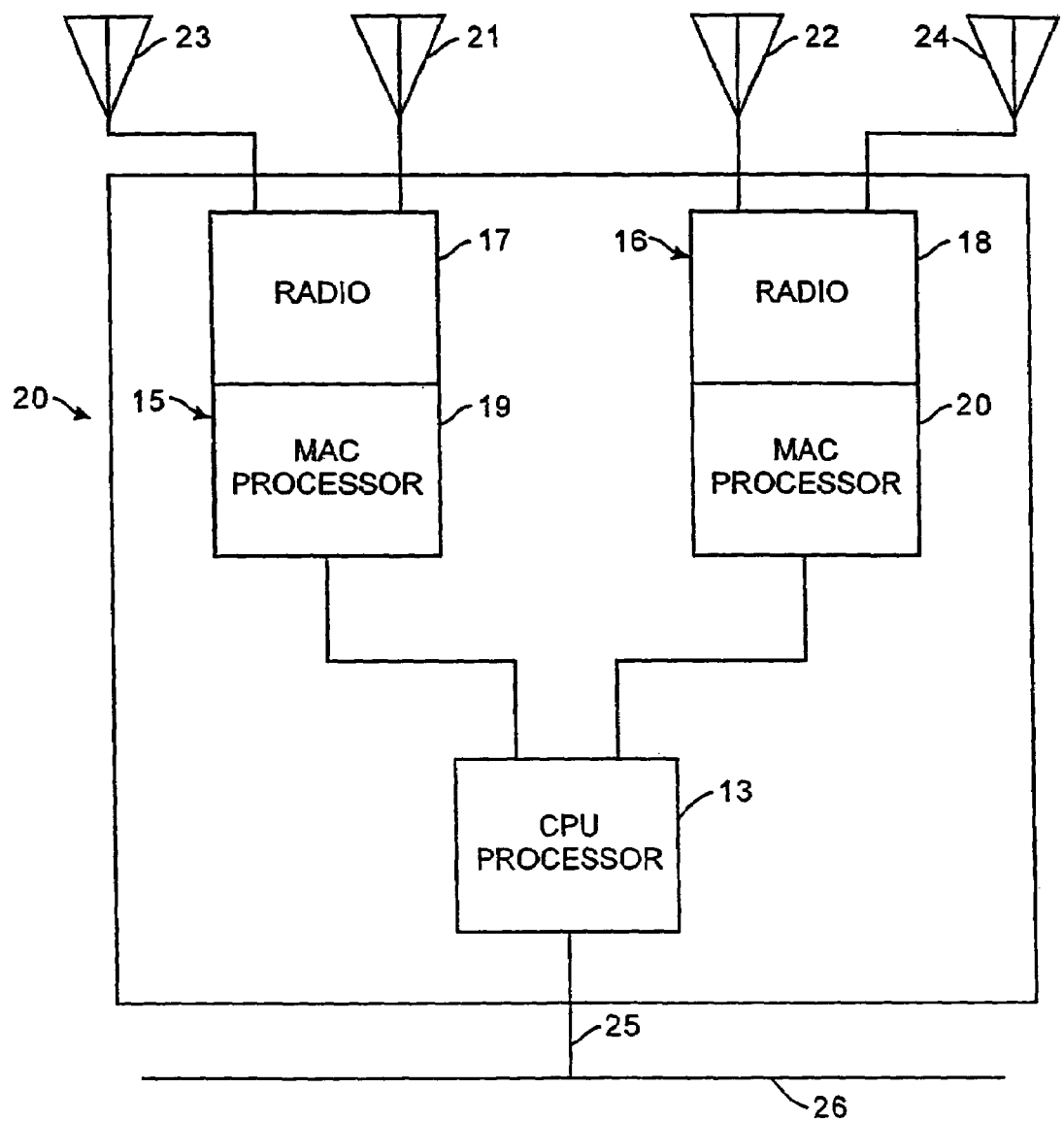
FIG. 2 is a schematic representation of another high reliability access point of the present invention utilizing an antenna diversity scheme at each wireless adapter.

Referring now to FIG. 2, another high reliability access point 20 built in accordance with the present invention is shown. In this embodiment, in addition to having an antenna diversity scheme at the access point level, there is an antenna diversity scheme at the wireless adapter level. Each wireless adapter 15 and 16 includes at least two antennas 21 and 23, 22 and 24, respectively positioned to create an antenna diversity scheme. Thus for the wireless adapter 15 the antennas 21 and 23 are either positioned sufficiently far apart, more than a quarter wavelength, or the antennas 21 and 23 are positioned in an asymmetrical or orthogonal manner to provide polarization diversity. The antennas 22 and 24 for the wireless adapter 26 are placed in a similar manner.

In this embodiment, an incoming signal is received on both antennas 21 and 23 of the wireless adapter 15. The MAC processor 19 then determines the quality if the signal coming in on each of the antennas 21 and 23 connected to the wireless adapter 15. Based upon the signal quality information, the MAC processor 19 will choose which of the antennas 21 and 23 to use to receive the incoming transmission. The MAC processor will also forward the signal quality information regarding the selected antenna to the CPU processor 13. The wireless adapter 16 will perform a similar process and forward the signal quality information for its best antenna to the CPU processor 13. The CPU processor 13 can then determine which wireless adapter is receiving the highest quality signal and use that wireless adapter to receive the incoming transmission and respond to the transmitting station.

When a high reliability access point wishes to transmit a message, such as an acknowledgment of a received message, to a roaming computer device, the CPU processor 13 will utilize the received quality signal information to determine which wireless adapter to use to send the message. Likewise, if the wireless adapter is utilizing an antenna diversity scheme it will also select the most appropriate antenna for transmitting a message.

While one of the wireless adapters is transmitting, the other wireless adapter can operate as a promiscuous listener to determine if the correct message is being sent. For example, referring to FIG. 1, if the CPU processor 13 is sending a message to a roaming computer device via wireless adapter 16, wireless adapter 17 can operate in the receive mode and monitor the message being sent by the wireless adapter 16. This provides a local loop back capability and allows the access point to perform self-monitoring. If the CPU processor 13 determines that one of the wireless adapters is not operating correctly, the malfunctioning wireless adapter can be disabled. Additionally, the CPU processor 13 can then send a message to the system management portion of the host network via the infrastructure 26 that it has a defective wireless adapter and repairs are needed.

Referring again to the configuration in which each of the wireless adapters is listening on the same channel, another advantage achieved by this configuration is the ability to receive two concurrent messages. In an access point that only contains one adapter, this situation will cause a collision and neither message will be received. In a high reliability access point built in accordance with the present invention, it is possible that the one wireless adapter will be able to receive one of the messages while the other wireless adapter receives the other, due to multipath fading at each of the wireless adapter antennas.

Figure 3:
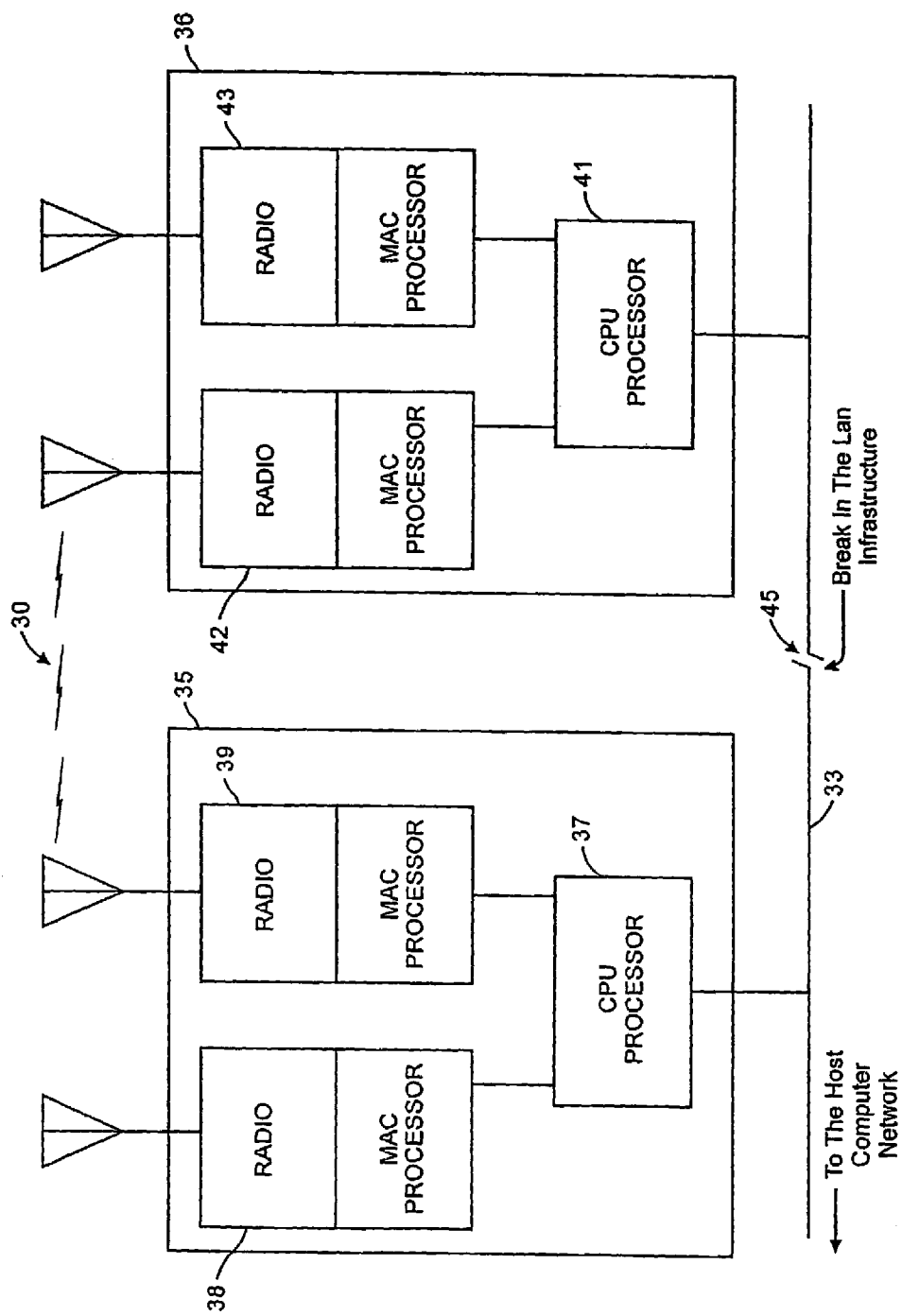
FIG. 3 is a representation of a distribution network for a wireless LAN system utilizing high reliability access points.

Referring now to FIG. 3, a portion of a distribution network 30 utilizing high reliability access points is shown. The distribution network 30 includes an infrastructure 33 and two high reliability access points 35 and 36. Access point 35 includes a CPU processor 37 and two wireless adapters 38 and 39. Access point 36 includes a CPU processor 41 and two wireless adapters 42 and 43. In the present example, a break 45 in the infrastructure 33 has occurred. Access point 35 is upstream to the break with respect to the host computer network and thus is not immediately affected by the break 45. However, access point 36 is downstream to the break 45 and therefore is no longer connected to the host computer network.

When a situation like this occurs, the downstream access point 36 will begin attempting to communicate with an upstream access point using wireless communication. In this example, the upstream access point is access point 35. However, the communication need not be with the access point immediately upstream, the only requirement is that it be with an access point which is upstream with respect to the break. The host computer network or other access points will previously have shared the logistic and address information concerning all of the access points to each access point in the distribution network.

Once communications with an upstream access point 35 is established, each access point 35 and 36 will dedicate one of its wireless adapters 39 and 42, respectively to provide a wireless repair of the break 45 in the infrastructure 33. When this happens, the CPU processor for each of the access points will instruct the dedicated wireless adapter to change so that it is no longer operating on the same channel as the other adapter in the access point. A communication channel between access points is established. The dedicated wireless adapters 39 and 42 will no longer be used to transmit or receive information to or from roaming computer devices. However, the non-dedicated wireless adapters 38 and 43 will communicate with the roaming computer devices. Once the top priority of reestablishing communications between all of the access points in the distribution network 30 and the host computer network has been accomplished, the access points can then send a message to the system management portion of the host computer network detailing where the break (or breaks) exists.

It is conceivable that the distribution network could lose its entire infrastructure. In this case, each of the high reliability access points would dedicate one of its wireless adapters to network infrastructure communications while retaining one of its wireless adapters for communication with roaming computer devices. Using the same technique described above, a temporary or remote access point could be established that, intentionally, is not connected to the infrastructure. This configuration is discussed below in greater detail with reference to FIG. 5. The use of directional gain antennas for the dedicated wireless adapter would allow the temporary or remote access point to be positioned a considerable distance from the infrastructure.

Figure 4:
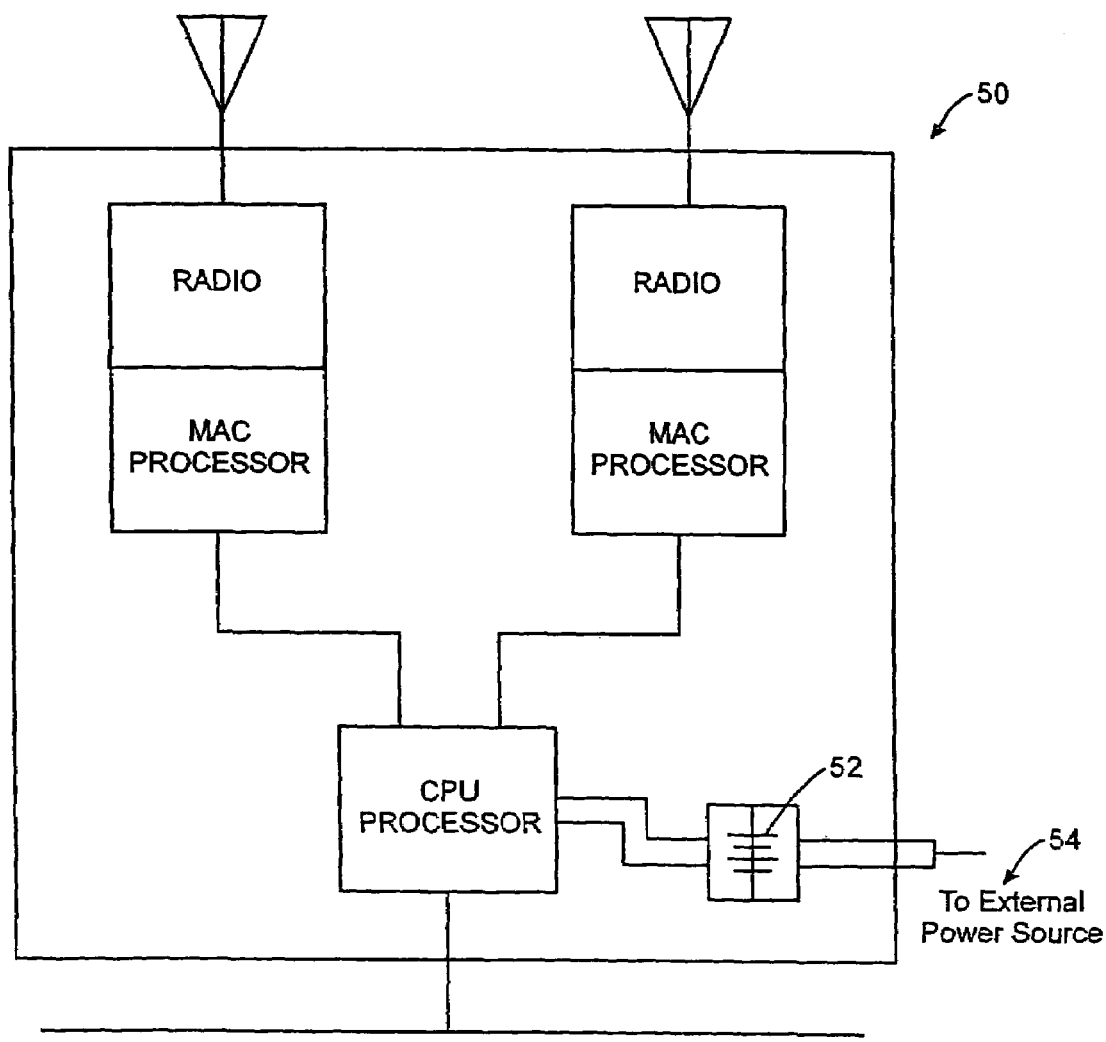
FIG. 4 is a schematic representation of a high reliability access point with a backup power supply.

Referring now to FIG. 4, a high reliability access point 50 with a backup power supply 52 is shown. Typically, the access point will be wired to an external power source 54 such as a wall outlet. However, there is a great desire that if power is lost that the distribution network not shut down since the roaming computer devices will normally not be dependent upon the external power source 54. In this embodiment of the present invention, the back-up power source 52 is wired in parallel with respect to the external power source 54. Thus, if the external power source 54 fails, the access point 50 will not lose power.

Figure 5:
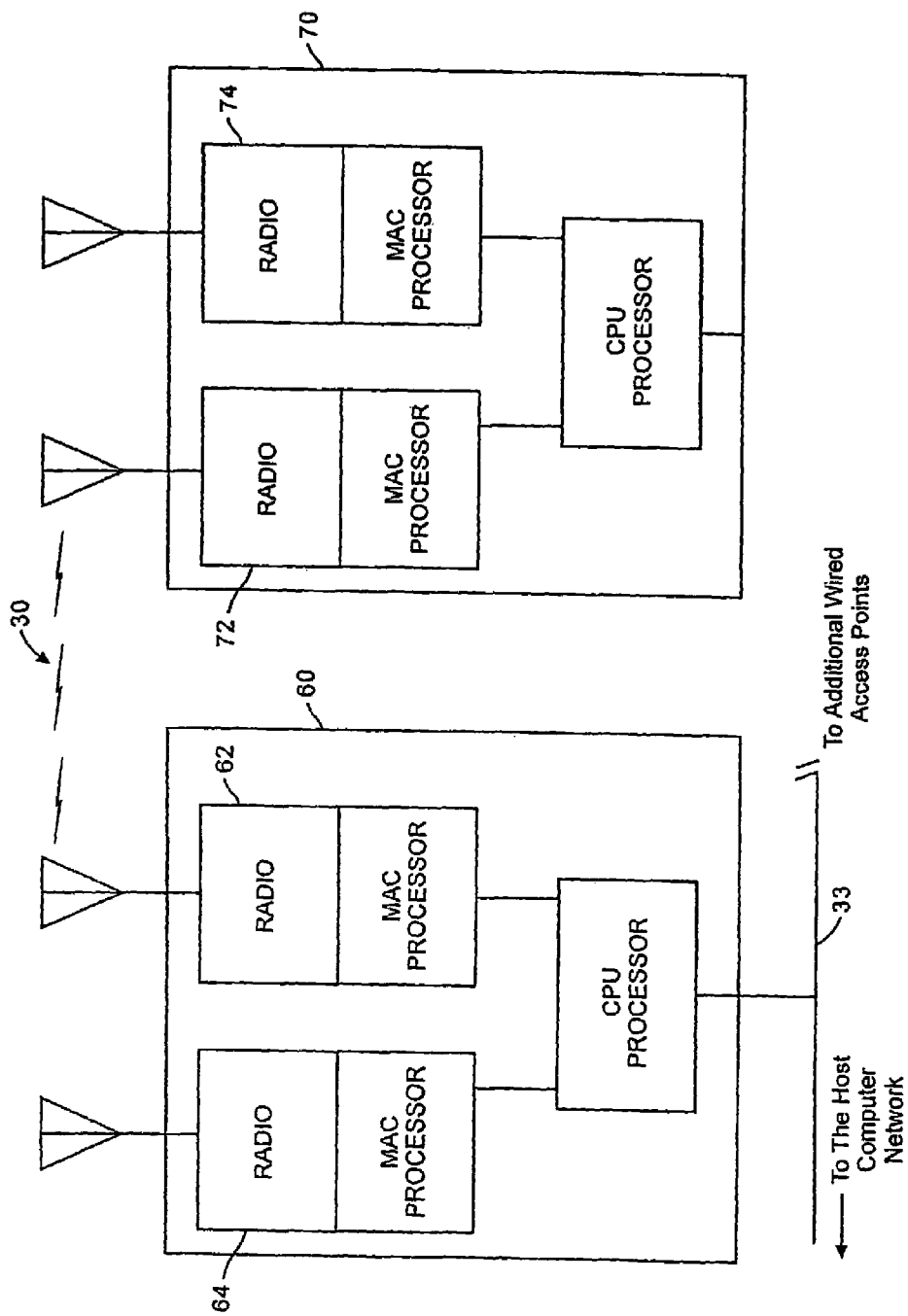
FIG. 5 is a schematic representation of a remote high reliability access point connecting to the distribution network.

Referring now to FIG. 5, a remote access point 70 is shown connecting to the infrastructure 33 by means of dedicated wireless adapters 62 and 72. The access point 70 is not hard wired to the infrastructure 33. Therefore, the access point dedicates one of its wireless adapters 72 to network infrastructure communication. The other wireless adapter 74 continues to communicate with roaming computer devices within the range of the access point 70. An access point 60 that is hard wired into the infrastructure 33 dedicates one of its wireless adapters 62 to network infrastructure communication and establishes a link between the infrastructure 33 and the remote access point 70. The access point 60 can continue to service the roaming computer devices within its range through the wireless adapter 64.

The hard wired access point 60 that is used to connect the remote access point 70 to the infrastructure need not be the access point that is physically closest to the remote access point 70. Use of the directional antenna would allow a remote access point to establish communication with virtually any of the access points that are hard wired to the infrastructure. Additionally, several remote access points could establish wireless infrastructure communication by each dedicating one of their wireless adapters. In this arrangement, only one of the remote access points need be in communication with a wired access point. All other remote access points could establish communication with the host computer network via the remote access point in communication with a wired access point.

Figure 6:
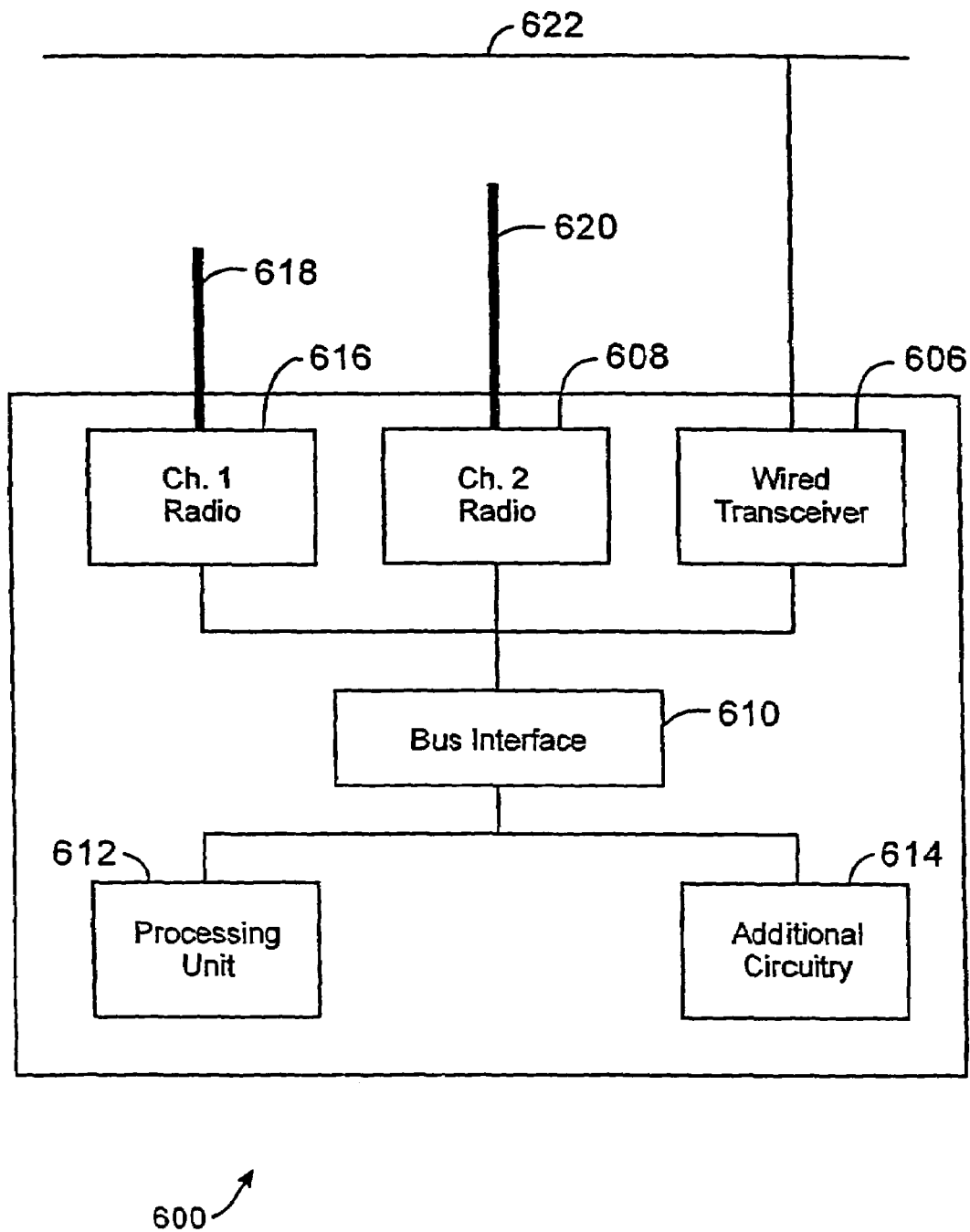
FIG. 6 is block diagram illustrating an embodiment of an access point built in accordance with the present invention which includes two radios and a wired network interface, a first one of the radios operable on a first channel and a second one of the radios operable on a second channel.

FIG. 6 is block diagram illustrating an embodiment of an access point 600 built in accordance with the present invention capable of communicating with wireless devices in its cell on both a first channel and a second channel. The access point 600 thus includes a first radio 616 operating on a first channel and a second radio 608 operating on a second channel. The access point also includes a processing unit 612 and additional circuitry 614, both of which couple to the first radio 616, the second radio 608 and a wired Ethernet transceiver through a bus interface 610. The wired transceiver 606 allows the access point 600 to access a wired LAN backbone 622 to which various other system components may connect. The wired LAN backbone may include, for example, an ethernet network, a token-ring network or an asynchronous transfer mode (ATM) network among other network types. In any such case, the wired transceiver 606 facilitates communication between the access point 600 and devices coupled to the wired LAN backbone 622.

The blocks illustrated in FIG. 6 are simplified for exemplary purposes, and it will be understood by one skilled in the art that an access point 600 according to the present invention is not limited to the block circuitry shown in FIG. 6. In another embodiment, the access point 600 may contain additional transceivers for communicating on other channels, over other mediums and in other networks as well.

The first channel radio 616 couples to first antenna 618 while the second channel radio 608 couples to second antenna 620. The antennas 618 and 620 may either be protruding or non-protruding antennas, depending upon system requirements. The first channel radio 616 and the second channel radio 608 operate independently to form a first communication cell and a second communication cell, respectively. When a radius of the first communication cell substantially equals a radius of the second communication cell, the cells substantially overlay one another. However, when the radii of the communication cells differ, the larger cell fully overlays and extends beyond the smaller cell. The first and second channels may operate using different frequencies, modulation schemes and code spreading schemes. The selections of such operational channel variations depend on overall system constraints, yet should result in two independent channels that do not interfere with one another unacceptably.

The bus interface 610 isolates the processing unit 612 and the additional circuitry 614 of the access point 600 from the operating characteristics of the radios 616 and 608 and the wired transceiver 606. Thus, communication with any of the transceivers can be accommodated by general circuitry and software routines of the access point 600. In one embodiment, the bus interface 610 is a PCI bus interface with the first channel radio 616, second channel radio 606 and wired transceiver compatible with PCI bus standards. However, in other embodiments, differing interface standards may be employed.

In operation, the processing unit 612 is programmed with the network configuration to route communications through the first channel radio 616, the second channel radio 608 and the wired transceiver 606. However, roaming portable units may alter the network configuration as they move between cells. Thus, the access point 600 periodically polls devices within its communication cell to update the network configuration. Updates are entered and forwarded for other units in the system.

Incoming messages received via the wired transceiver 606 may be stored, displayed and routed via the first channel radio 616 or routed via the second channel radio 608 to portable data terminals or other wireless devices operating within the cell(s) of one or more of the access point 600. Similarly, an incoming message on one of the radios 616 or 608 may be stored, displayed, routed through one of the radios 616 or 608 or routed through the wired transceiver 606, depending upon the message destination and type.

By providing routing within the access point 600 between the first channel radio 616 and the second channel radio 608, message delivery is expedited. Further, as will be described herein, by providing two radios in various access points, fewer cells may be required to adequately service a premises such as a factory. Moreover, when one of the radios is employed to provide control within a cell while the other radio provides primary communication within the cell, collisions between devices may be eliminated Still further, when one of the radios provides a deterministic communication path while another one of the radios provides a non-deterministic communication path, data and message transmissions within the network may be controlled to satisfy bandwidth requirements of the various devices within the system. It may be preferable to utilize a deterministic communication path for some types of communications such as telephony video or real-time data transfer, for example. However, when the preferred deterministic path is unavailable for some reason, the alternative non-deterministic path may still be used.

The access point 600 may synchronize transmissions on the first channel radio 616 and the second channel radio 608 to avoid unacceptable conflicts between transmissions on one radio and receipts on the other radio. In this fashion, unacceptable conflicts are minimized.

Figure 7A:
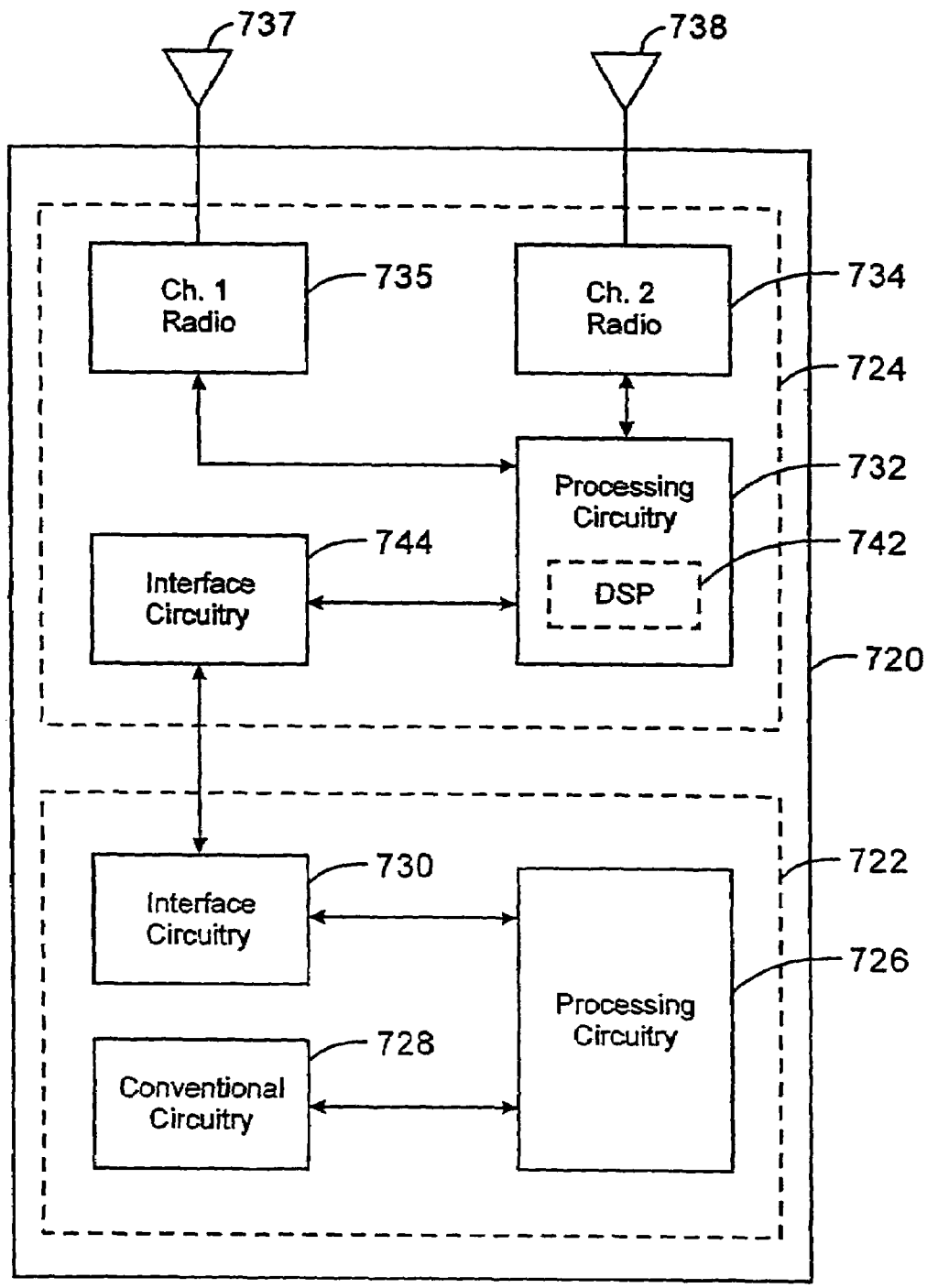
FIG. 7a is a block diagram illustrating an embodiment of a portable data terminal according to the present invention, the portable data terminal having a single PCMCIA card that contains two radios, a first one of the radios operable on the first channel and a second one of the radios operable on the second channel.

FIG. 7a is a block diagram illustrating an embodiment of a portable data terminal 720 according to the present invention, the portable data terminal having a single PCMCIA card that contains two radios. In particular, the portable data terminal 720 contains terminal circuitry 722 that includes processing circuitry 726, conventional terminal circuitry 728 and interface circuitry 730. The interface circuitry 730 provides a PCMCIA interface for receiving PCMCIA cards of various functionality. Terminal circuitry 722 is well known and can be found in conventional portable or hand held computing devices.

Via the interface circuitry 730, the portable data terminal 720 accepts PCMCIA cards. As illustrated, the PCMCIA card inserted constitutes a communication module 724 that provides wireless access on two channels. Specifically, the communication module 724 comprises processing circuitry 732, first channel radio 735, second channel radio 734 and interface circuitry 744. The first channel radio 735 communicates via first antenna 737 while the second channel radio 734 communicates via second antenna 738. Configured and operable in this manner, the portable data terminal 720 may communicate with the access point 600 of FIG. 6 on either the first channel or the second channel.

Independent of whether the first channel radio 735 or the second channel radio 734 is used, the processing circuitry 726 delivers and receives data and messages via the interface circuitry 730 in the same manner and format, i.e., the interface circuitry 730 supports a common communication interface and protocol. The processing circuitry 732 of the communication module 724 receives data and messages via the interface circuitry 744. The processing circuitry 732, including a DSP 742, participates to assist in wireless communication via both the first channel radio 735 and the second channel radio 734. Thus, the module 724 not only saves on PCMCIA slots, but also saves costs and increases reliability by sharing common circuitry resources. In particular, the first channel radio 735 and second channel radio 734 share the interface circuitry 744 and processing circuitry 732 which includes the DSP 742. In another embodiment of the portable data terminal 720, a PCMCIA compatible wired network adapter could be installed which would also share some of the common circuitry resources.

Figure 7B:
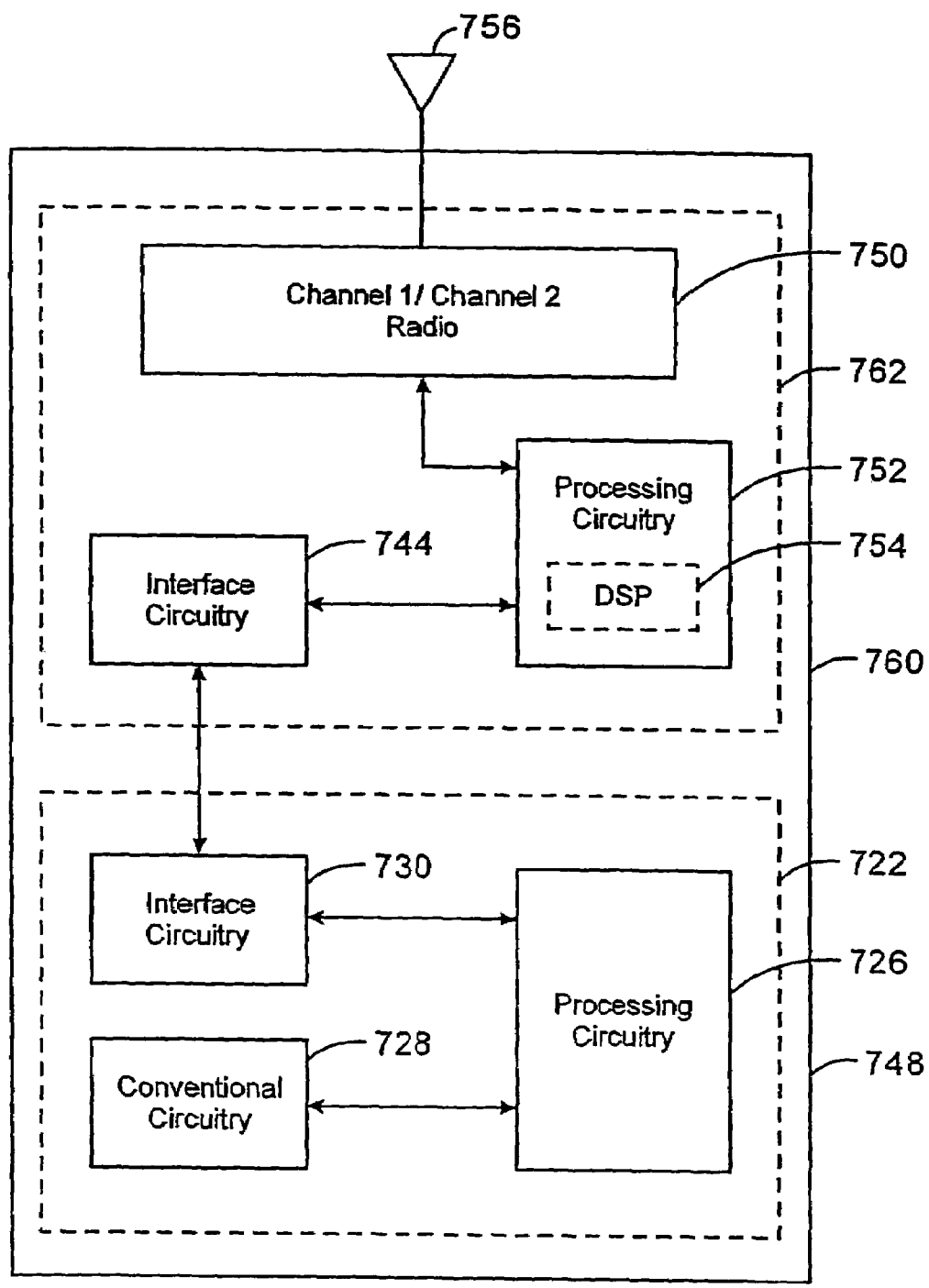
FIG. 7b is a block diagram illustrating an alternative embodiment of the portable data terminal of FIG. 7a, wherein the single PCMCIA card includes a single radio operable on the first charnel and the second channel and controlled by the processing circuitry.

FIG. 7b is a block diagram illustrating an alternative embodiment of a portable data terminal 748 that receives a single PCMCIA card having a radio 750 that includes two separate radio units. As contrasted to the dual radio design of the portable data terminal 720 of FIG. 7a, the radio 750 of the portable data terminal 748 of FIG. 7b operates on both the first channel and the second channel. The radio 750 is coupled to antenna 756 and controlled by processing circuitry 752 that includes digital signal processing circuitry 754. The radio 750 includes a first radio unit operable on the first channel and a second radio unit operable on the second channel with the radio units sharing some common components.

The processing circuitry 752 may control operation of the radio 750 in a simplex fashion such that the radio 750 operates on the first channel as required and operates on the second channel as required. Because the radio 750 may includes circuitry shared by the radio units, the radio 750 may only operate on one channel at a given time. By multiplexing its operation over time, however, the radio 750 provides sufficient coverage on the channels at a reduced cost. Other components of the portable data terminal of FIG. 7b were previously described with reference to FIG. 7a and will not be further described herein.

Figure 8:
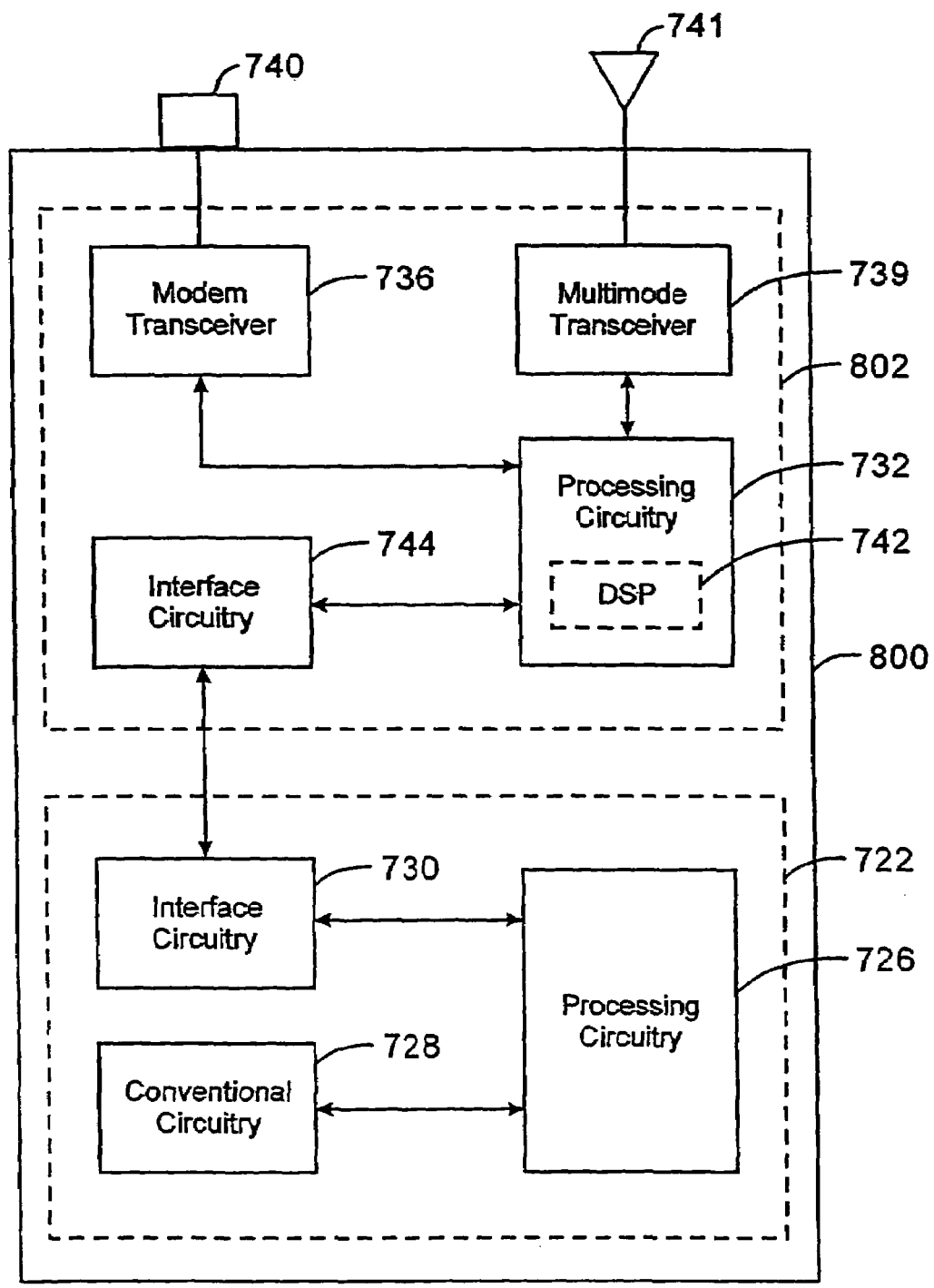
FIG. 8 is a block diagram illustrating an alternative embodiment of a portable data terminal according to the present invention, the portable data terminal having a single PCMCIA card that contains a multi-channel wireless transceiver and a wired network interface.

FIG. 8 is a block diagram illustrating an alternative embodiment of a portable data terminal 800 according to the present invention, the portable data terminal 800 having a single PCMCIA card that contains a multi-channel (or multi-mode) wireless transceiver 739 and a wired network interface 736 (or modem transceiver). The portable terminal 800 includes terminal circuitry 722 and a module 802 including various components previously described with reference to FIG. 7a. The terminal circuitry 722 includes processing circuitry 726, conventional terminal circuitry 728 and interface circuitry 730. The communication module 802 includes processing circuitry 732, the multi-mode wireless transceiver 739, the wired modem transceiver 736 and interface circuitry 744. When in use, the wired modem transceiver 736 interfaces via a jack 740 to a telephone line (not shown). Similarly, the wireless multi-mode transceiver 739 communicates via an antenna 741.

The processing circuitry 732 of the communication module 802 receives data and messages via the interface circuitry 744. If the modem transceiver 736 is being used, the processing circuitry 732 appropriately (de)segments and (de)compresses the data/messages utilizing a digital signal processor (DSP) 742. Otherwise, the processing circuitry 732, including the DSP 742, participate to assist in wireless communication via the multi-mode transceiver 739. Thus, the module 802 not only saves on PCMCIA slots (as required when a conventional radio card and a conventional modem card are both being used), but also saves costs and increases reliability by sharing common circuitry resources.

The multi-mode transceiver 739 is frequency nimble and may operate in various modes, such as those that may be used with a frequency spreading scheme such as those described in U.S. Pat. No. 5,425,051 issued Jun. 13, 1995 to Ronald L. Mahany, which is incorporated herein by reference. Thus, the multi-mode transceiver 739 may operate on both the first channel and the second channel and communicate with the access point 600 of FIG. 6 on either the first channel or the second channel. As will be further described herein, operation on differing channels may be employed to reduce installed system component requirements, to alleviate various potential interfering operating conditions and to more efficiently route data and messages within the wireless local area network.

Figure 9:
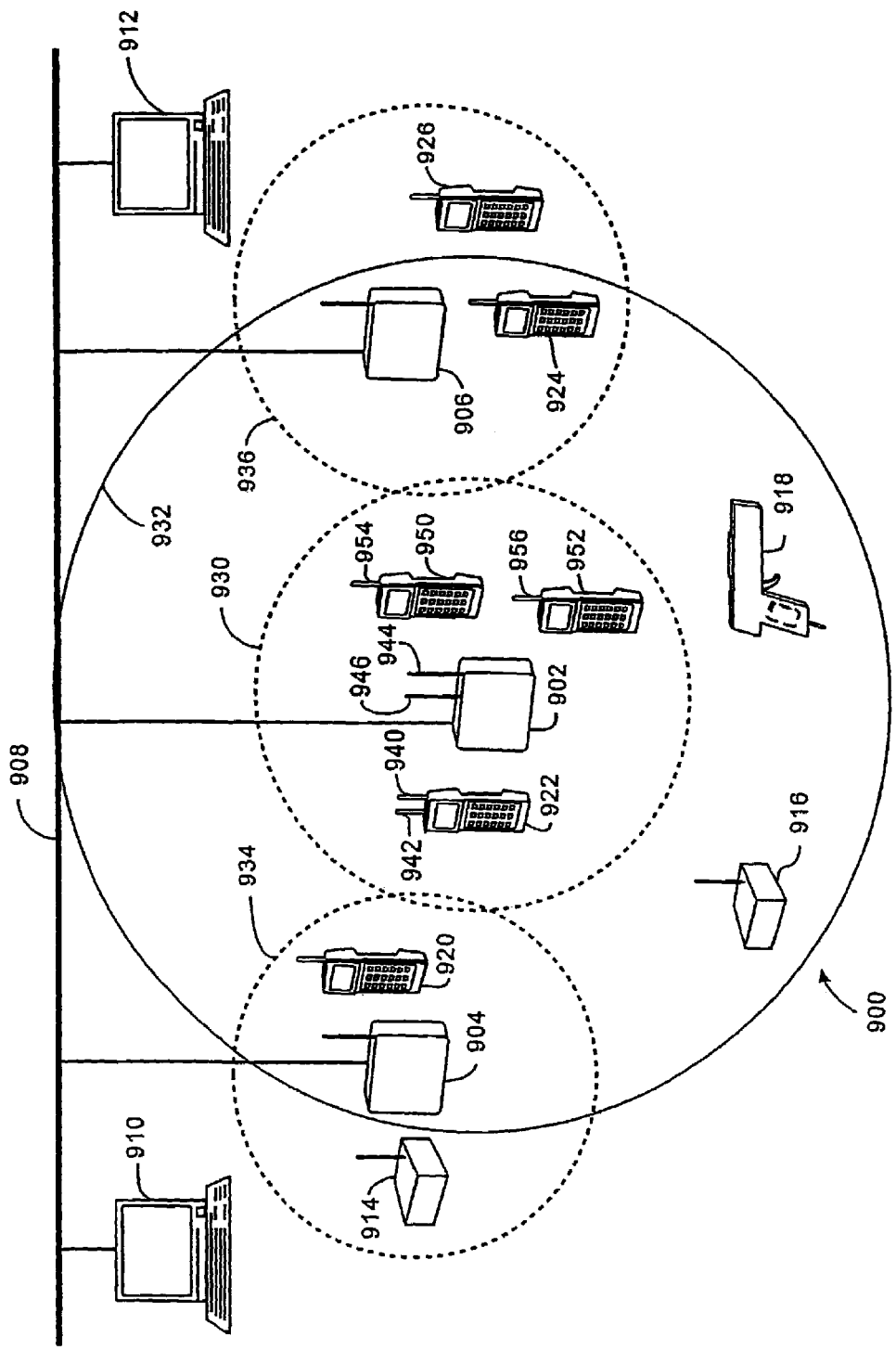
FIG. 9 is a diagram illustrating a communication system built and operating according to the present invention, the communication system including at least one access point having multiple radios, portable terminals having multiple radios and portable terminals having multi-channel radios.

FIG. 9 is a diagram illustrating a communication system 900 built and operating according to the present invention. The communication system includes an access point 902 operating on two channels and access points 904 and 906 operating on a single channel. Each of the access points 902, 904 and 906 connects to a wired LAN backbone 908 to facilitate wired communication between the access points and computer systems 910 and 912 connected to the wired LAN backbone 908.

Access point 902 includes both a first channel radio and a second channel radio. In the embodiment illustrated, the first channel radio creates a first channel cell 930 extending with a first channel radius about the access point 902. The second channel radio of the access point 900 creates a second channel cell 932 extending with a second channel radius about the access point 902. As illustrated, the second channel cell 932 has a larger radius than the radius of the first channel cell 930. To create the relatively larger cell, the second radio may operate at a higher power, operate at a lower data rate or operate in another differing manner to create the relatively larger cell.

Access points 904 and 906 generate first channel cells 934 and 936, respectively. Portable data terminals 920, 922, 924 and 926 and scanning unit 918 communicate with the various access points 902, 904 and 906 and roam about the communication system 900, potentially moving from cell to cell. Other devices, such as stationary printers 914 and 916 typically remain within one cell of the communication system 900. In the embodiment illustrated, portable data terminals 920 and 926 include multi-mode radios while portable data terminals 922 and 924 include both a first channel radio and a second channel radio. However, in other embodiments, some of the portable data terminals may only on one of the channels.

As illustrated, terminal 922 includes a first channel antenna 940 and a second channel antenna 942 while access point 902 includes both a first channel antenna 944 and a second channel antenna 946. Thus, whenever the terminal 922 roams within the second channel cell 932, the terminal 922 communicates via a second channel radio and second channel antenna 942. Further, terminal 950 may communicate with access point 902 on the first channel via its first channel antenna 954 when resident within the first channel cell 903. Finally, terminal 952, having a single radio operable the first channel via antenna 956 may communicate with access point 902 on the first channel when resident within the first channel cell 932.

As shown, portable data terminal 922 resides both within the first channel cell 930 and the channel cell 932 generated by access point 902. Thus, the portable data terminal 922 may communicate with access point 902 on either the first channel or the second channel. However, printer 916 and scanning unit 918 reside only within the second channel cell 932 generated by access point 902 and must communicate with the access point 902 on the second channel.

Print data originating at computer 910 and intended for printer 916 travels from computer 910, through the wired LAN backbone 908 to access point 902 and across first channel cell 932 to the printer 916. During this transmission, the data is routed through the wired LAN backbone and the wireless network based upon the network locations of the computer 910 and the printer 916. The combination of these segments forms a unique network path. However, a message moving from portable data terminal 926 to portable data terminal 922 may be routed along two different network paths. While both network paths include access point 906, wired LAN backbone 908 and access point 902, one network path includes first channel cell 930 while the other network path includes second channel cell 932. Thus, depending upon system conditions and the system configuration, the message is routed via one of the two network paths. Such conditions may include cell traffic, required data rates and other factors.

Figure 10:
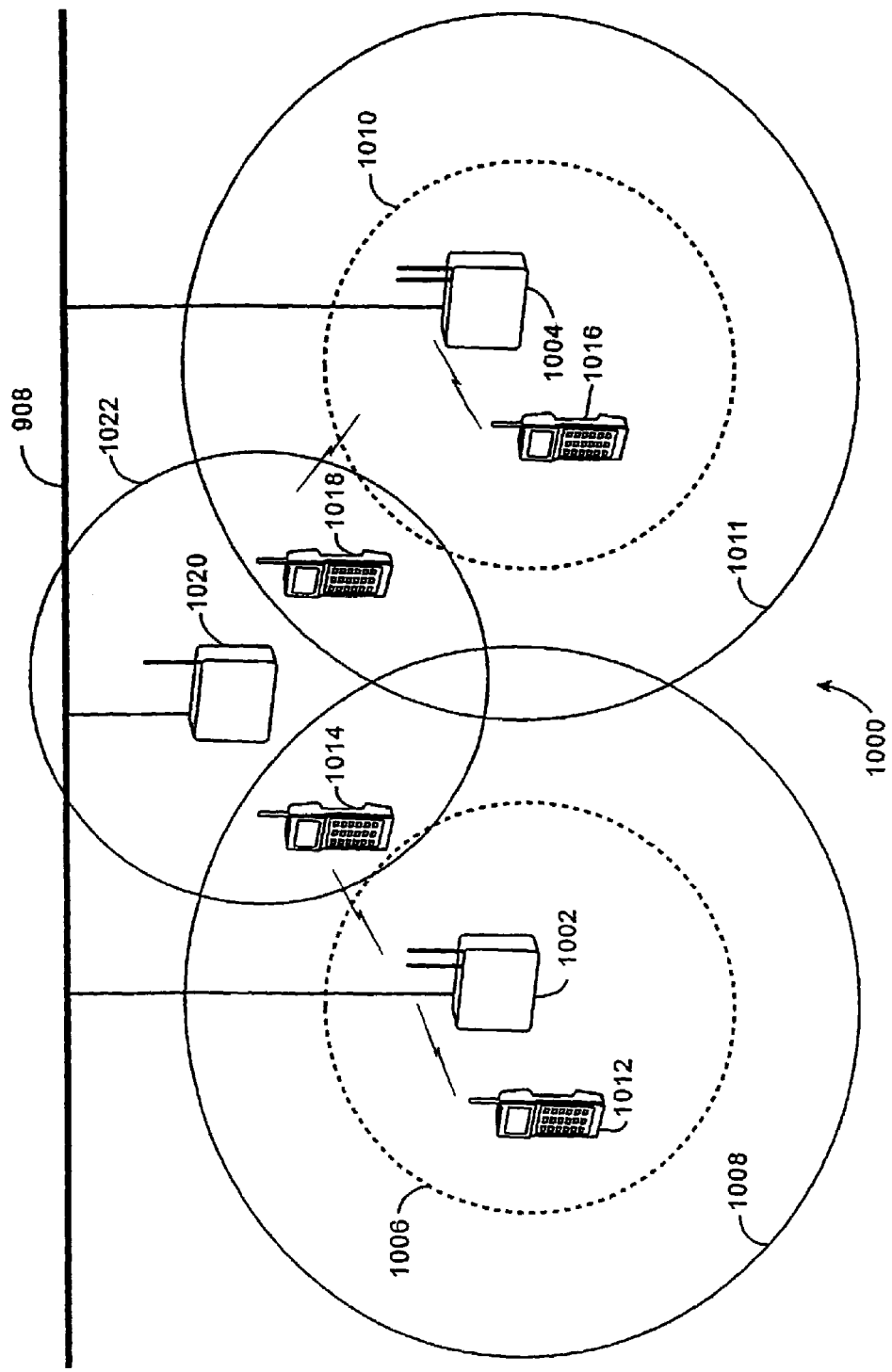
FIG. 10 is a diagram illustrating a communication system built and operating according to the present invention wherein one of the access points facilitates communication between portable terminal units operating on different channels within its cell by routing communication between two of its radios.

FIG. 10 is a diagram illustrating a communication system 1000 built and operating according to the present invention wherein one of the access points routes communication between two portable terminal units operating on different channels within its cell. In the communication system 1000, both a first access point 1002 and a second access point 1004 include both first and second channel radios. The first access point 1002 generates a first channel cell 1006 and a second channel cell 1008 within which portable data terminals 1012 and 1014 operate. Further, second access point 1004 generates a first channel cell 1010 and a second channel cell 1011 within which portable data terminals 1012 and 1014 may operate. In the embodiment, the system 1000 prefers to route communication on the first channel due to its characteristics although the portable data terminals may operate on either channel.

As illustrated, portable data terminal 1012 resides within both the first channel cell 1006 and the second channel cell 1008 generated by access point 1002. However, portable data terminal 1014 resides only within the second channel cell 1008 of the access point 1002. Thus, in the transmission of a message from portable data terminal 1012 to portable data terminal 1014, access point 1002 receives the message from portable data terminal on the first channel radio and transmits the message to portable data terminal 1014 on the second channel. With reference to FIG. 6, the processing unit 612 receives the message via the first channel radio 616 across the bus interface 610. The processing unit 612 determines the destination of the message, and routes the message back across the bus interface 610 to the second channel radio 608 that transmits the message to portable data terminal 1014. Access point 1004 also provides multiple channel routing of messages between portable data terminals 1016 and 1018.

Without the multiple channel communication capabilities of the communication system 1000, an additional access point 1020 having a first channel cell 1022 would be required to facilitate communication with portable data terminals 1014 and 1018. The cost of such an additional access point 1020 would not only include the cost of the access point 1020 itself but the expense of connecting the access point 1020 to the wired LAN backbone 908 and AC power. The cost of such addition would far exceed the cost of the second channel radios in access points 1002 and 1004. Furthermore, in some installation, extensions of the wired LAN backbone 908 are not possible. Even if such access point 1020 were installed the exemplary communication would require routing of messages between portable data terminal 1012 and 1014 across the wired LAN backbone 908. Such additional loading slows operation of the wired LAN backbone 908 and decreases system performance.

Figure 11:
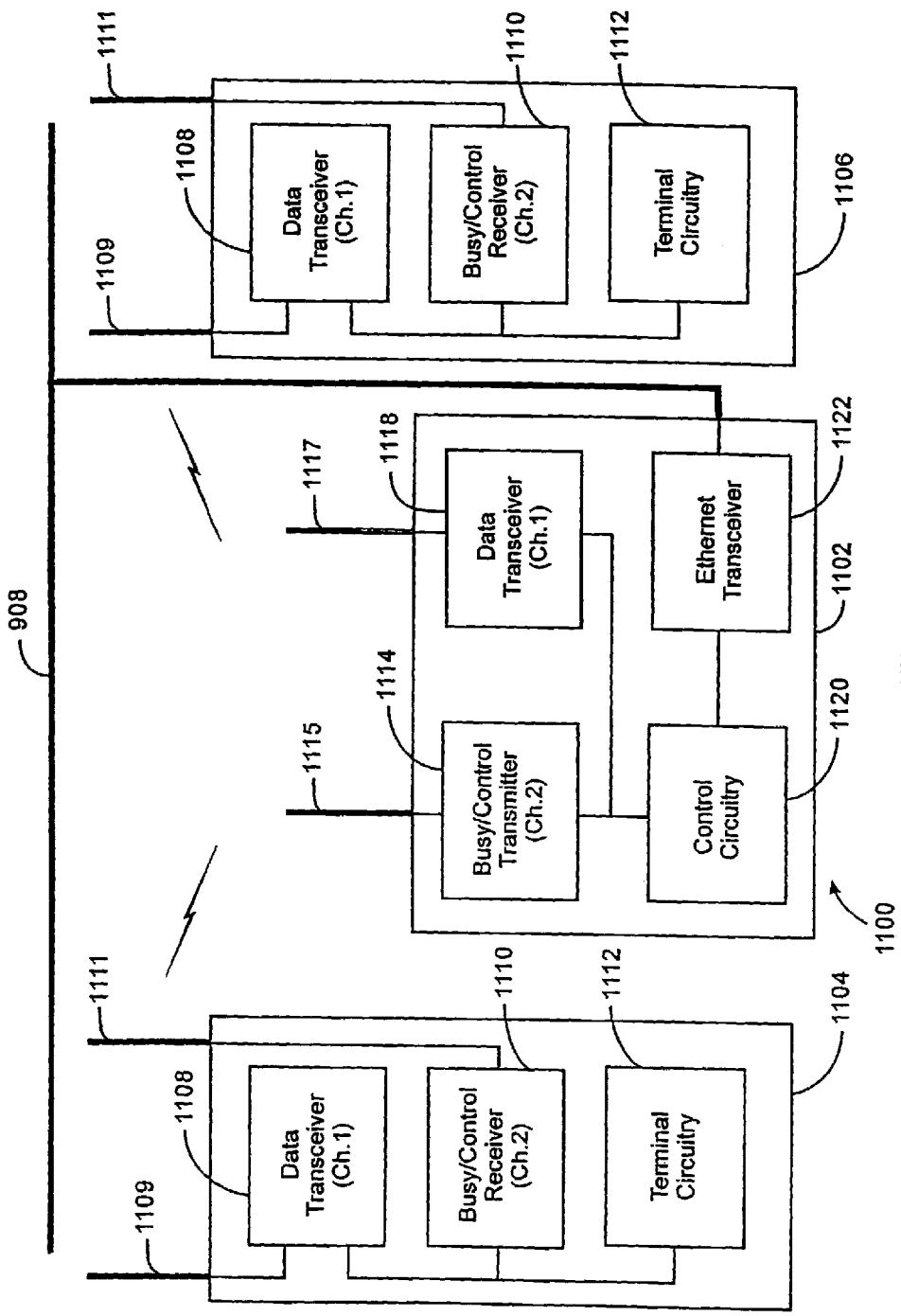
FIG. 11 is a block diagram illustrating an embodiment of a communication system according to the present invention wherein an access point uses a dedicated control/busy channel transmitter to manage transmissions between the access point and a plurality of roaming portable data terminals within its cell.

FIG. 11 is a block diagram illustrating an embodiment of a communication system 1100 according to the present invention wherein an access point 1102 uses a dedicated control/busy channel transmitter 1114 operating on a busy/control channel to manage transmissions between the access point 1100 and a plurality of roaming portable data terminals 1104 and 1106 within its cell. The communication system may also contain wired communication to a wired Ethernet backbone LAN 908.

The access device 1102 includes control circuitry 1120, a data transceiver 1118, a busy/control transmitter 1114 and antennas 1115 and 1117. The data transceiver 1117 supports communication on a communication channel (first channel) between the access point 1102 and wireless network devices operating within range of the access point, such as the portable data terminals 1104 and 1106. Further, the busy/control transmitter 1114 supports transmissions on the busy/control channel (second channel). The Ethernet transceiver 1115 supports communication between the backbone LAN 908 and the control circuitry 1120.

Portable data terminals 1104 and 1106 include terminal circuitry 1112, a data transceiver 1108 that communicates on the communication channel via antenna 1109 and a busy/control receiver 1110 that receives busy/control information via antenna 1111. As previously described, the communication channel and the busy/control channel are non-convergent and may operate concurrently in a single area or location. However, the access point 1102 must operate so as not to interfere with incoming transmissions by concurrently initiating a transmission. Thus, in one embodiment, transmissions on the communication channel and the control/busy channel are synchronized to prevent such conflicts.

The access point 1102 employs the busy/control transmitter 1114 to control operations within the first wireless network cell. In one embodiment, the access point 1102 periodically transmits control parameters that the portable data terminals 1104 and 1106 use to synchronize with communications on the communication channel For example, with the data transceiver of the communication channel operating in a spread spectrum mode, the busy/control transmitter 1114 transmits code spreading sequences, frequency hopping parameters and other operating parameters that allow the portable data terminals 1104 and 1106 to communicate within the cell on the communication channel. Such control information may be intermittently transmitted by the access point 1102 or may be continuously transmitted.

Additionally, the access point 1102 transmits a busy signal on the busy/control transmitter 1114 to authorize communication within the cell. To prevent portable data terminal 1104, for example, from transmitting while portable data terminal 1106 is communicating with the access point 1102, the access point 1102 transmits a busy signal on the busy/control channel using the busy/control transmitter 1114. The portable data terminal 1104 receives the busy signal and does not transmit information while such busy signal is active, perhaps entering a sleep mode instead and waking up periodically to determine availability The busy signal may include a continuous transmission or periodic transmission. However, in both embodiments, portable data terminals 1104 and 1106 listen with their respective control/busy receivers 1110 prior to initiating communication with the access point 1102. Thus, upon roaming into range of the wireless access device 1102, the portable data terminals 1104 do not interfere with ongoing communication.

Figure 12:
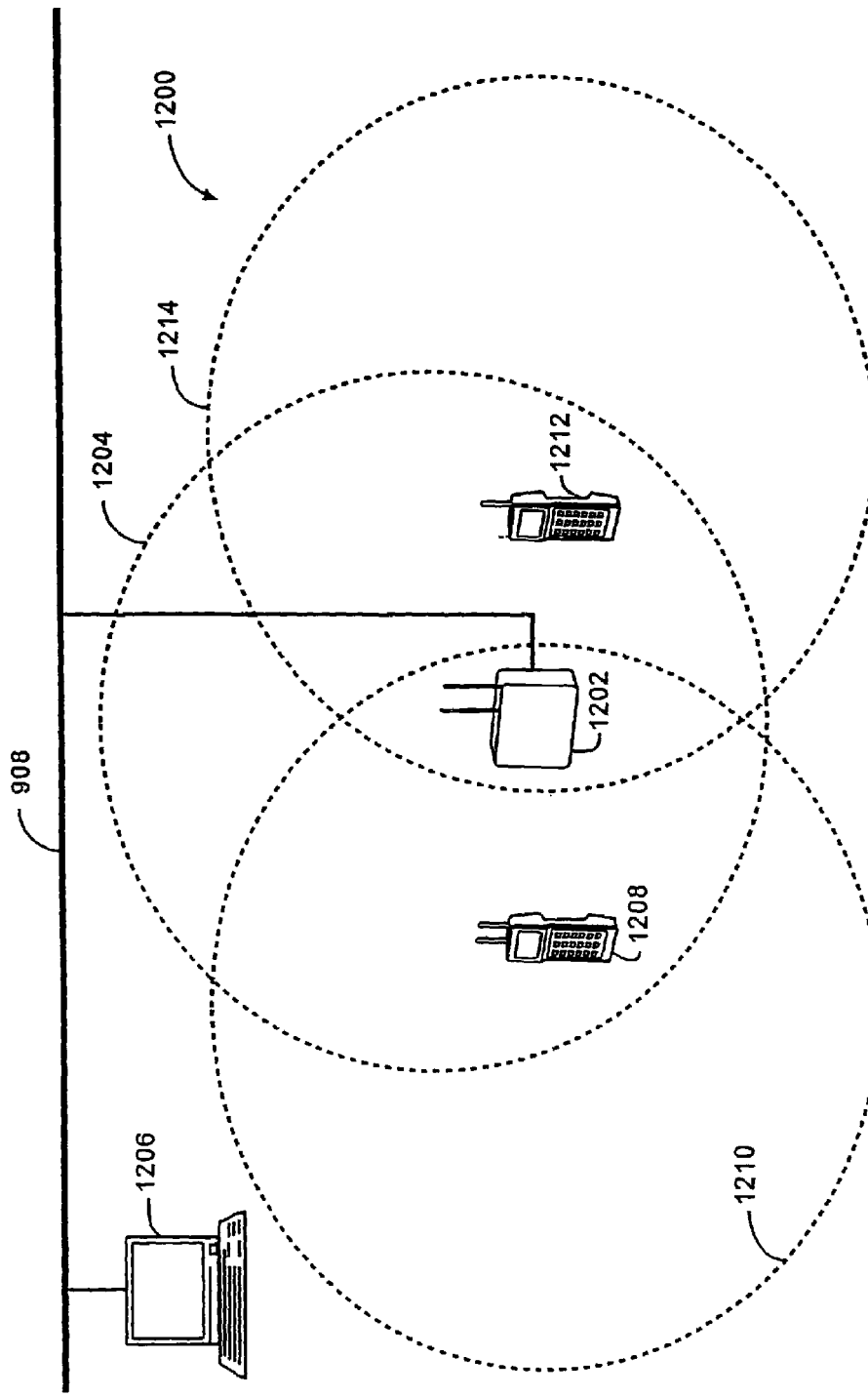
FIG. 12 is a drawing illustrating advantageous operation of the access device and portable data terminals of FIG. 11 when two roaming terminals encounter hidden terminal conditions.

FIG. 12 is a drawing illustrating advantageous operation of the access device and portable data terminals of FIG. 11 when two roaming terminals encounter hidden terminal conditions. In particular, each of the portable data terminals 1208 and 1212 is configured to listen on the busy/control channel and to communicate on the communication channel only when the communication channel is clear (available). In this configuration, when no desire to communicate is present, the portable data terminals 1208 and 1212 need only occasionally check the busy/control channel to identify any outstanding messages or communication requests as transmitted by the access device 1202. If either portable data terminal 1208 or 1212 desires to participate on the communication channel (to initiate communication or to respond to awaiting messages or communication requests), that terminal need only monitor the busy/control channel long enough to identify that the communication channel is clear before responding to a poll on the communication channel. As before, the wireless access device 1202 may also periodically identify the communication channel mode and associated parameters as selected and reselected by the wireless access device 1202.

To fully appreciate this process, first assume that the portable data terminals 1208 and 1212 are not within range of the wireless access device 1202. Upon wandering within range of the access device 1202, the portable data terminal 1212 begins listening for transmissions on a busy/control channel. Within some time period thereafter, the access device 1202 participates on the busy/control channel to transmit current channel conditions and optionally, the currently selected communication channel definition (i.e., mode and parameters) and/or pending message and communication request indicators. After identifying a need to participate, the portable data terminal 1212 awaits a transmission from access device 1202 (on the busy/control channel) that the selected communication channel is clear (not in use). When the channel is clear, the portable data terminal 1212 begins participating thereon.

Second, assume that, while the portable data terminal 1212 is engaged in ongoing communication with a computing device 1206 on a backbone LAN 908 via the access device 1202, the portable data terminal 1208 comes within range of the access device 1202 and desires to participate on the communication channel. The portable data terminal 1208 adapts itself to participate on the busy/control channel and identifies, in periodic transmissions from the access device 1202, that the communication channel is busy. Thus, the portable data terminal 1208 must monitor the busy/control channel to identify when the communication channel is clear before participating on the communication channel.

This operation works whether or not the portable data terminals 1208 and 1212 are within range of each other. In particular, portable data terminal 1208, portable data terminal 1212 and access device 1202 have transmission ranges illustrated by dashed circles 1210, 1214 and 1204, respectively. Although both portable data terminals 1208 and 1212 are within range of the access device 1202, neither are in range of each other and, thus, are referred to as "hidden" from each other. The access device 1202 is within range of both of the portable data terminals 1208 and 1212. If the portable data terminal 1208 attempted to transmit on the communication channel while the portable data terminal 1212 was transmitting, a collision would occur at the wireless access device 1202. However, this is not the case because both of the portable data terminals 1208 and 1212 must receive a communication channel clear indication on the busy/control channel from the access device 1202 that is in range of both, avoiding the hidden terminal problem. When participation is completed on the communication channel, the portable data terminals 1208 and 1212 resume monitoring of the busy/control channel.

Participation by the access device 1202 on the busy/control channel need only be by transmitting, although receiving might also be employed in case the busy/control channel is to be shared. Similarly, participation by the portable data terminals 1208 and 1212 need only be by receiving transmissions, although transmitting might also be employed. In particular, transmission might be employed by a wireless terminal on the busy/control channel if the wireless terminal does not support the currently selected communication channel, i.e., does not support the mode and associated parameters.

Figure 13:
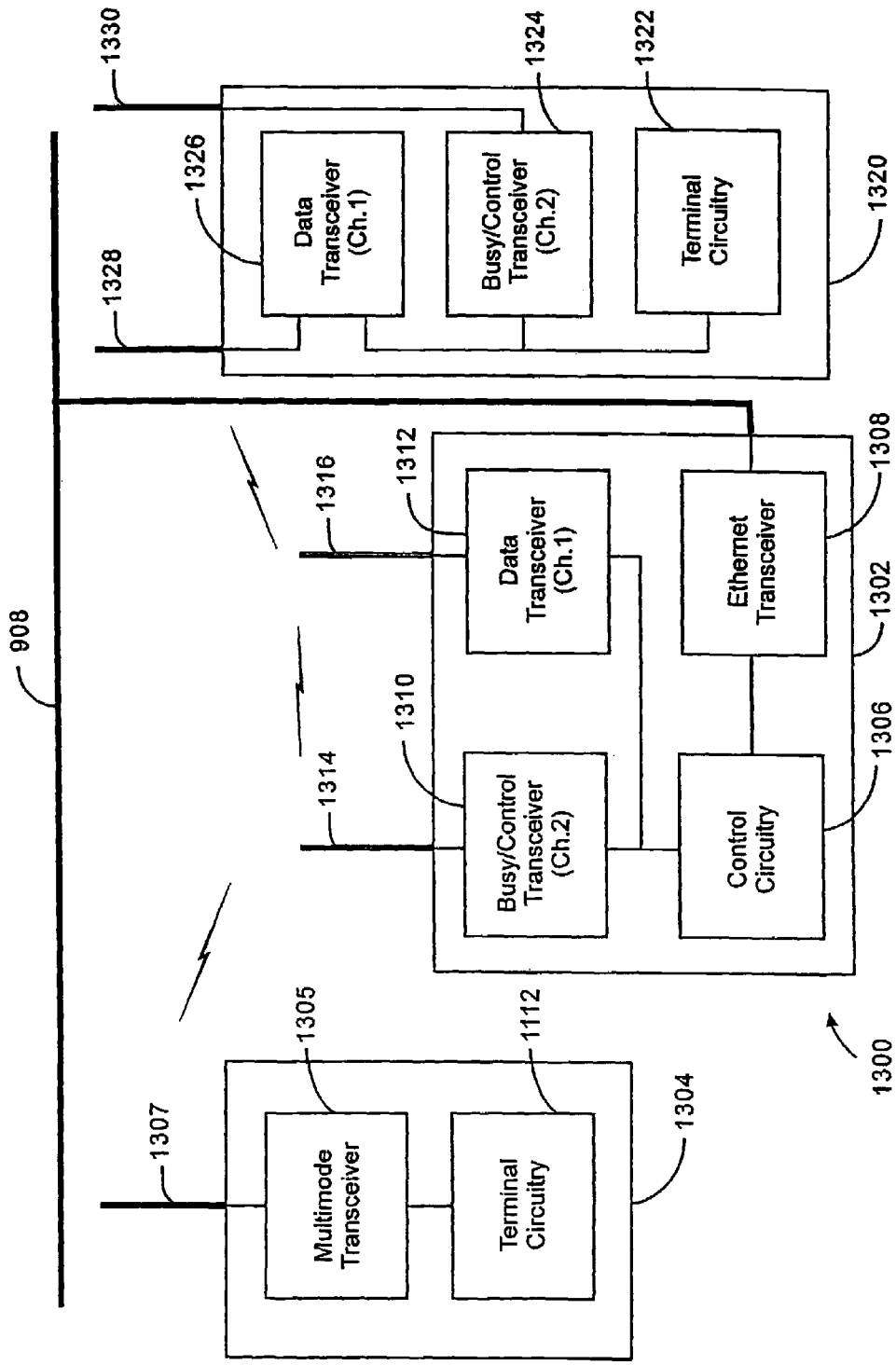
FIG. 13 is a block diagram illustrating an alternate embodiment of the communication system of the present invention wherein an access point includes a dedicated control/busy channel transceiver and roaming data terminals communicate with the access point using either frequency nimble multi-channel transceivers or dedicated control/busy channel transceivers.

FIG. 13 is a block diagram illustrating an alternate embodiment of the communication system 1300 of the present invention wherein an access point 1302 includes a dedicated control/busy channel transceiver 1310 and roaming data terminals 1304 communicate with the access point 1302 using either frequency nimble multi-channel transceivers 1305 or a dedicated control/busy channel transceiver 1326. Thus, the communication system 1300 facilitates bi-directional communication on the busy/control channel so that the access point 1302 may optimize operation of the system 1300.

In addition to the busy/control transceiver 1310 coupled to antenna 1314, the access point includes control circuitry 1306, a data transceiver 1312 coupled to antenna 1316 that facilitates wireless communication on the communication channel and an Ethernet transceiver 1308 that couples the access point 1302 to the backbone LAN 908. Portable data terminal 1304 includes terminal circuitry 1112 and a multi-mode/multi-channel transceiver 1305 that allows the portable data terminal 1304 to communicate both on the busy/control channel and the communication channel. Portable data terminal 1320 includes terminal circuitry 1322, a busy/control transceiver 1324 coupled to antenna 1330 that allows the portable data terminal 1320 to communicate on the busy/control channel and a data transceiver 1326 coupled to antenna 1328 that allows the portable data terminal to communicate on the communication channel.

Having separate radio units and antennas, the access device 1302 participates on: 1) a selected communication channel, servicing data exchanges in the communication network cell; and 2) the busy/control channel defined by predetermined mode and parameter information known to all wireless transmitters, controlling access to the selected communication channel. Such participation is often simultaneous, preventing a portable data terminal 1304 or 1320 from having to wait long on the busy/control channel for a transmissions. Within a predefined maximum time period, the portable data terminal 1304 or 1320 receives transmissions from the access device 1302 identifying currently selected communication channel mode and associated parameters, should such be required. The access device 1302 periodically broadcasts such information on the busy/control channel to capture terminals that happen to need communication channel definitions (e.g., selected mode and parameters) to participate. The portable data terminal 1304 utilizes the identified mode and associated parameter information to switch the multi-mode transceiver 1305 over to the selected communication channel and begins participation thereon. Portable data terminal 1320 may also alter the operation of the data transceiver 1326 based upon the receipt from the access point 1302.

In operation, the wireless terminal 1304 participates on the busy/control channel except when it has a need to gain access to the selected communication channel. Thus, its operation in the system 1300 is satisfactory. By including only the terminal circuitry 1112 and one radio, the portable data terminal is less costly than the multi-radio portable data terminal 1320. However, because the wireless terminal 1320 includes two radios, the portable data terminal 1320 may place the data transceiver 1326 in a low power state, and only power up the busy/control channel transceiver 1324 to check in. Thus, portable data terminal 1320 may consume less power that portable data terminal 1304.

Figure 14A:
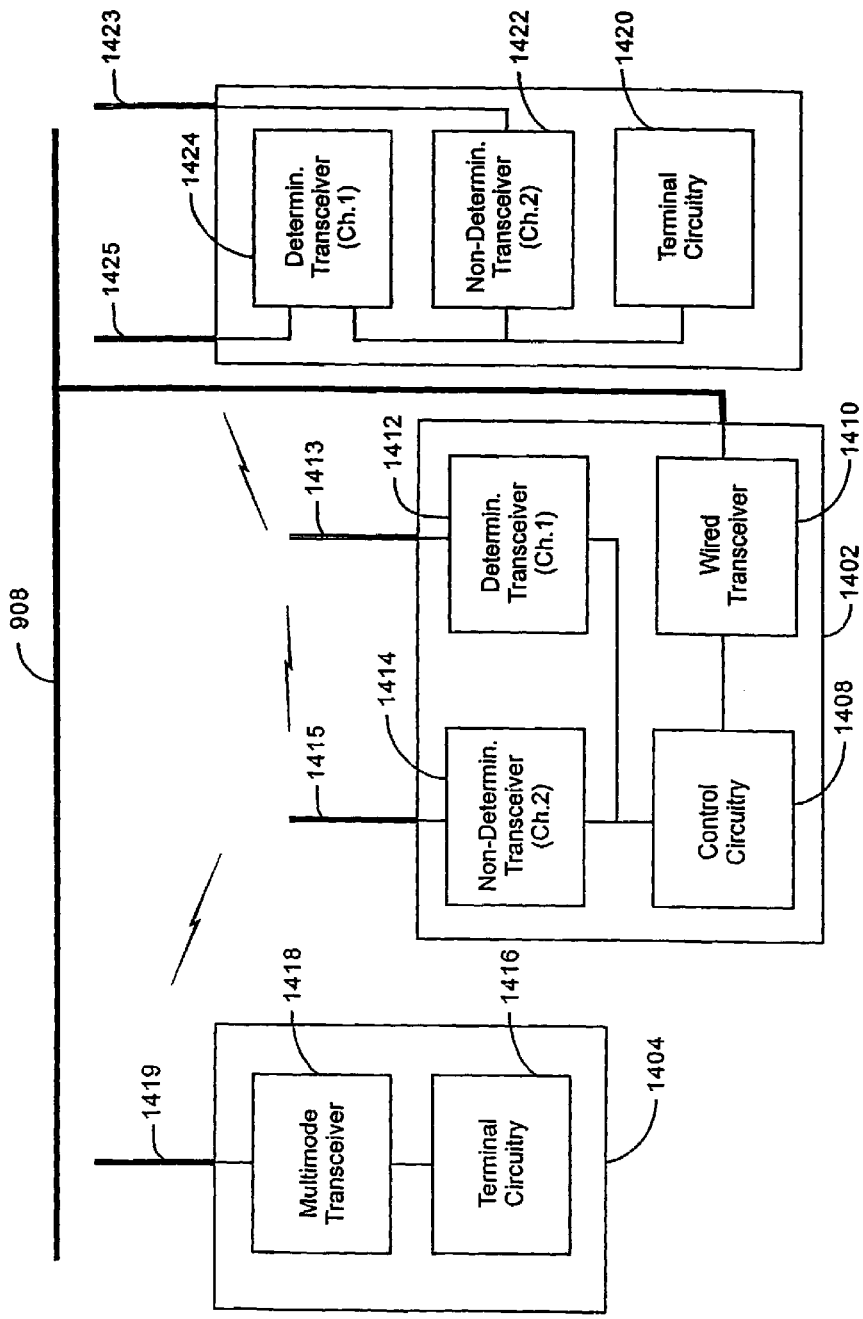
FIG. 14a is a block diagram illustrating a communication system of the present invention wherein access points and portable data terminals operate on a deterministic first channel and a non-deterministic second channel and the system routes communications on the channels based upon system conditions.

FIG. 14a is a block diagram illustrating a communication system 1400 according to the present invention wherein an access point 1402 and portable data terminals 1404 and 1406 operate on a deterministic first channel and a non-deterministic second channel and the system 1400 routes communications on the channels based upon system conditions and/or the requirements of a particular communication. To carry out such functionality, the access device 1402 may comprise control circuitry 1408, a wired LAN transceiver 1410 and either a single, configurable transceiver (for operating on both the deterministic and non-deterministic channels, not shown) or a single transceiver 1412 coupled to antenna 1413 for operating on the deterministic channel and a single transceiver 1414 coupled to antenna 1415 for operating on the non-deterministic channel.

In one embodiment, the deterministic channel allocates a particular communication bandwidth to each wireless device requiring communication, perhaps in a polled, token passing or time slotted implementation. Such operation may be required where many wireless devices reside within a single cell and compete for communication with the access point 1402. In the embodiment, the access point 1402 also allows all devices within the cell to compete for available bandwidth on the non-deterministic channel. However, the access point 1402 may provide overrides to dynamically reallocate bandwidth in the deterministic channel and to assign bandwidth on the non-deterministic channel as may be required for the particular operating conditions.

With a single multi-mode transceiver 1418 coupled to antenna 1419 controlled by terminal circuitry 1416, the portable data terminal 1404 operates on either the deterministic channel or the non-deterministic channel at any time. Alternatively, portable data terminal 1406 having terminal circuitry 1420, a deterministic transceiver coupled to antenna 1425 and a non-deterministic transceiver 1422 coupled to antenna 1423 communicate on both the deterministic channel and non-deterministic channel simultaneously.

Independent of their differing constructions, the portable data terminals 1404 and 1406 may determine which channel to operate upon. During data transfer operations wherein data transfer rates are not critical, portable data terminal 1404 may determine that the deterministic channel provides sufficient bandwidth. In that case, the portable data terminal 1404 configures its multi-mode transceiver 1418 to operate on the deterministic channel. However, during voice message transfer operations, the portable data terminal 1404 may determine that the bandwidth of the deterministic channel is not satisfactory. In that case, the terminal circuitry 1404 would configure the multi-mode transceiver 1418 to operate on the non-deterministic channel.

Figure 14B:
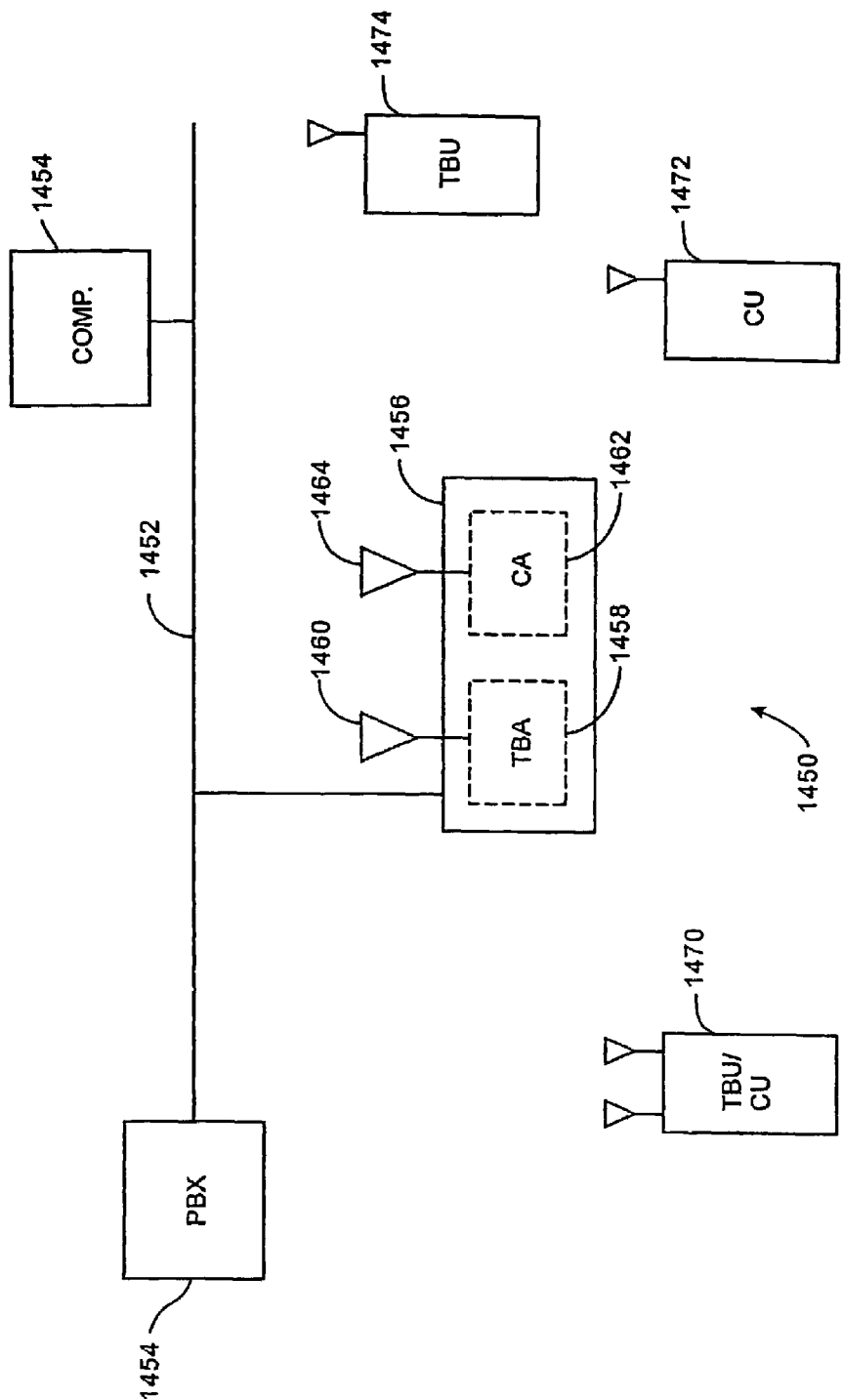
FIG. 14b is a diagram illustrating operation of a communication system of the present invention having both wired and wireless communication capability that includes at least one access point providing communication over a deterministic, time bounded first channel and a non-deterministic, contention access second channel.

FIG. 14*b* is a diagram illustrating a communication system 1450 according to the present invention that facilitates both wired and wireless communications. The communication system 1450 includes a wired backbone 1452 and at least one access point 1456 that supports communication over a deterministic, time bounded first wireless channel and a non-deterministic, contention access second wireless channel. Along with the access point 1456, the communication system 1450 may also include a PBX (Private Broadcast Exchange) system 1454, one or more of a computer 1454, and other typical wired network devices interconnected by the wired backbone 1452. Additionally, the communication system 1450 comprises a plurality of wireless network devices, such as wireless terminals 1470, 1472 and 1474, which may be portable hand-held devices, mobile computing devices, laptop computers, wireless peripherals, etc.

Communication upon the wired backbone 1452 may be accomplished according to various communication techniques. In one embodiment, communication upon the wired backbone 1452 occurs via an STM (Synchronous Transfer Mode) protocol wherein the wired backbone 1452 serves as an STM backbone. With the STM protocol, a particular bandwidth is provided for each communication link established between a sending and a receiving device attached to the wired backbone 1452.

In another embodiment, communication upon the wired backbone 1452 is carried out using an ATM (Asynchronous Transfer Mode) protocol in which bandwidth between a sending and a receiving device on the wired backbone 1452 is adjusted based upon immediate communication requirements. In such operation, the wired backbone 1452 serves as an ATM backbone. Operation according to the ATM protocol allows for variations in data transmission bandwidths as is immediately required but that provides an average bandwidth over time.

The at least one access point 1456 provides a link between the wireless and wired communications within the communication system 1450. The access point 1456 includes a time bounded adapter 1458 connected to an antenna 1460 which provides wireless communication on the deterministic, time bounded first wireless channel governed by a first wireless protocol. The access point 1456 also includes a contention adapter 1462 connected to an antenna 1464 which provides wireless communications on the non-deterministic, contention access second wireless channel governed by a second wireless protocol. Alternatively, part or all of the circuitry underlying the adapters 1458 and 1462 may be combined into a single unit to share common underlying functionality.

The wireless network device 1470 includes either a dual purpose transceiver or two transceivers for communicating on the first and second wireless channels via the first and second wireless protocols, respectively. A transceiver in the wireless network device 1472 only supports communication on the second wireless channel pursuant to the second wireless protocol. Likewise, a transceiver in the wireless network device 1474 supports communication on the first wireless channel pursuant to the first wireless protocol. For example, the wireless network device 1474 might comprise a portable phone unit operating using, e.g., PCS (Personal Communication Service) or other telephony protocol as the first wireless protocol.

Although direct communication is possible, to manage the first wireless channel, the at least one access point 1456 relays wireless communication between the wireless network devices 1470 and 1474 if both participate on the first wireless channel. If the at least one access point 1456 is the only access point involved that services the two devices 1470 and 1474, such relaying need not involve the wired protocol on the backbone 1452. If the device 1470 happens to communicate via the second wireless channel the access point 1456 internally translates and relays communications between the devices 1470 and 1474. Similarly, if the device 1470 intends to communicate with a wired network device using either the first or second wireless protocol the access point 1456 utilizes the first or second wireless protocols, respectively, to communicate with the device 1470. The access point 1456 also communicates with the target wired network device, e.g., the computer 1454, via the wired communication protocol. Relaying between the wired and wireless channels also requires translation.

If more than one access point is coupled to the wired backbone 1452, for example, to support many more wireless network devices, roaming wireless network devices and/or extended coverage regions, the access points only utilize wired backbone bandwidth if necessary. Each access point attempts to minimize external bandwidth (of wired and wireless channels) by preferring internally performed relaying and, when needed, translation (between the first and second wireless protocols, or between the wired protocol and either the first or the second wireless protocol).

The PBX system 1454 connects the wired backbone 1452 through a switched telephone network to other communication systems such as the system 1452. This facilitates communications between all wireless and wired network devices, such as the computer 1454, the device 1470 and remote network devices (devices) connected elsewhere to the switched telephone network. In circuit switched applications, a VLAN (virtual local area network) can be established between wired and wireless network devices coupled to the wired backbone 1452. Such coupling also includes remote network devices coupled via the PBX system 1454.

Figure 15:
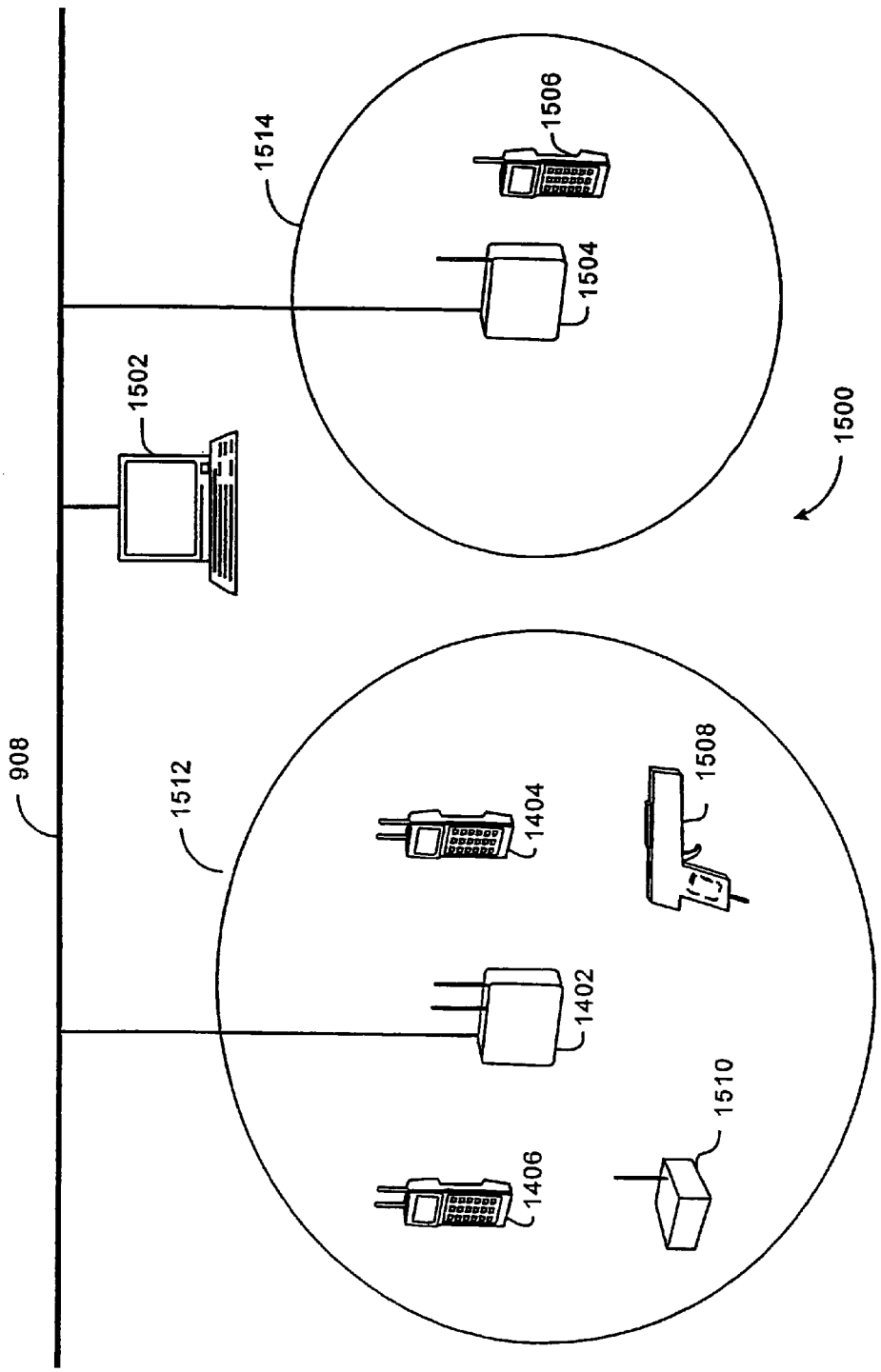
FIG. 15 is a diagram illustrating the use of the access points and portable data terminals of FIG. 14a wherein the system routes various transmissions within the network system according to system conditions such as channel activity, data type and data priority.

FIG. 15 is a diagram illustrating the access point 1402 and portable data terminals 1404 and 1406 of FIG. 14*a* wherein a system 1500 routes various transmissions according to system conditions such as channel activity, data type and data priority. In the system 1500, access point 1402 forms cell 1512 while access point 1504, operating on only a single channel, forms cell 1514. Thus, while access point 1402 must determine how to allocate wireless communications among the deterministic channel and non-deterministic channel in its cell 1512, access point 1504 routes all communications on its only channel.

In a first example of the operation of the system 1500, data from computer system 1502 is transmitted to portable data terminal 1406. The computer system 1502 transmits the data through the wired LAN backbone 908 to the access point 1402. The access point 1402, having a deterministic transceiver 1412 and a non-deterministic transceiver 1414, routes the data through one of the transceivers. Based upon the type of data, the quantity of data, the rate at which data may be passed on either channel, the amount of traffic on the channels and other conditions, the control circuitry 1408 in the access point 1402 routes the data on either the non-deterministic channel via the non-deterministic transceiver 1414 or on the deterministic channel via the deterministic transceiver 1412.

In the present example, the data to be transferred has a relatively low priority and the access point routes the data on the deterministic channel to the portable data terminal 1404. Likewise, print jobs from the computer 1402 to the printer 1510 would also have relatively low priority and be transmitted via the non-deterministic channel.

Next, consider data transmissions from scanner 1508 to computer system 1502. During operation, the scanner transmits an image to the computer system 1502 for decoding and the computer system 1502 returns decoded information at which point the scanner ceases scanning. Rapid transmission between the scanner 1508 and the computer system 1502 reduces the time within which the scanner 1508 performs scans. Thus, rapid transmissions may reduce energy consumption in the scanning process that drains battery life of the scanner 1508. Thus, the scanner 1508 and access point 1402 both attempt to transmit data on the non-deterministic channel at a relatively higher data transfer rate. However, if the non-deterministic channel is unavailable, the transmission on the deterministic channel may be satisfactory.

In the case of a voice message transmission from portable data terminal 1506 in cell 1514 to portable data terminal 1404 in cell 1512, transmission on the deterministic channel may be unsatisfactory. Thus, upon an incoming voice message transmission, the access point 1402 may reallocate the deterministic channel allocating additional bandwidth for the voice message. In an alternative operation, the access point 1402 may interrupt communication on the non-deterministic channel and transmit the voice message to the portable terminal unit 1404 on the non-deterministic channel. Thus, in the mode of operation of the system 1500 modifies its operation to provide sufficient bandwidth for the voice message.

In view of the above detailed description of the present invention and associated drawings, other modifications and variations will now become apparent to those skilled in the art. It should also be apparent that such other modifications and variations may be effected without departing from the spirit and scope of the present invention as set forth in the claims that follow.

What is claimed is:

1. Communication circuitry for communicatively coupling a first roaming wireless device and a second roaming wireless device, the communication circuitry comprising:
   in a communication device:
      a control circuit;
      a wired transceiver that is communicatively coupled to the control circuit, the wired transceiver for coupling to the wired link;
      a first wireless transceiver that is communicatively coupled to the control circuit, the first wireless transceiver for operating on a first wireless communication channel to communicatively couple with the first roaming wireless device; and
      a second wireless transceiver that is communicatively coupled to the control circuit, the second wireless transceiver for operating on a second wireless communication channel to communicatively couple with the second roaming device,
      where the control circuit accommodates communications between the first wireless transceiver and the second wireless transceiver.

2. The communication circuitry of claim 1, where the communication circuitry is adapted for coupling to computer interface circuitry.

3. The communication circuitry of claim 1, where the communication circuitry is disposed on a module adapted for insertion into a computing device.

4. The communication circuitry of claim 1, comprising, in the communication device, a bus interface communicatively coupling the control circuit to the first and second wireless transceivers and the wired transceiver.

5. The communication circuitry of claim 4, wherein the bus interface is substantially compliant with a bus standard.

6. The communication circuitry of claim 5, wherein the bus standard is a PCI standard.

7. The communication circuitry of claim 1, wherein the wired transceiver accommodates communication with an Ethernet network.

8. The communication circuitry of claim 1, wherein the wired transceiver accommodates communication with a token-ring network.

9. The communication circuitry of claim 1, wherein the wired transceiver accommodates communication with an asynchronous transfer mode network.

10. The communication circuitry of claim 1, wherein the wired transceiver accommodates communication with a packetized network.

11. The communication circuitry of claim 1, wherein the first wireless transceiver supports a substantially non-deterministic media access protocol and the second wireless transceiver supports a substantially deterministic media access protocol.

12. The communication circuitry of claim 1, wherein the first wireless transceiver and the second wireless transceiver support substantially distinct non-deterministic media access protocols.

13. The communication circuitry of claim 1, wherein the first wireless transceiver and the second wireless transceiver operate independently to form a first communication cell and a second communication cell.

14. The communication circuitry of claim 1, wherein the control circuit synchronizes transmissions on the first wireless communication channel and the second wireless communication channel to minimize conflicts between transmissions on one wireless transceiver and receipts on the other wireless transceiver.

15. The communication circuitry of claim 1, wherein the wired link is a local area network.

16. The communication circuitry of claim 1, wherein the first wireless transceiver and the second wireless transceiver have substantially different operating characteristics.

17. Communication circuitry comprising:
   in a communication device:
      a first wireless transceiver operating to establish a first wireless cell;
      a second wireless transceiver operating to establish a second wireless cell,
      the first and second wireless transceivers operating such that the first and second cells are substantially overlapping;
      a control circuit that communicatively couples the first and second wireless transceivers to one another; and
      a wired transceiver that communicatively couples the control circuit to a wired link,
      where the control circuit communicatively couples the first wireless transceiver and the wired transceiver.

18. The communication circuitry of claim 17, where said communication circuitry is adapted for coupling to computer interface circuitry.

19. The communication circuitry of claim 17, where said communication circuitry is disposed on a module adapted for insertion into a computing device.

20. The communication circuitry of claim 17, wherein the first wireless transceiver comprises processing circuitry that supports a first wireless communication protocol, and the second wireless transceiver comprises processing circuitry that supports a second wireless communication protocol different from the first wireless communication protocol.

21. The communication circuitry of claim 17, wherein the control circuit allows communications between the first wireless transceiver and the second wireless transceiver.

22. The communication circuitry of claim 17, wherein the first wireless transceiver supports a substantially non-deterministic media access protocol and the second wireless transceiver supports a substantially deterministic media access protocol.

23. The communication circuitry of claim 17, wherein the first wireless transceiver and the second wireless transceiver support substantially distinct non-deterministic media access protocols.

24. Communication circuitry for controlling operation of a communication device having at least a wired transceiver operable to communicate over a wired link, a first wireless transceiver operable to communicate with at least a first roaming wireless device over a first wireless communication channel, and a second wireless transceiver operable to communicate with at least a second roaming wireless device over a second wireless communication channel, said communication circuitry comprising:
a control circuit operational to, at least:
communicatively couple to the wired transceiver;
communicatively couple to the first wireless transceiver;
communicatively couple to the second wireless transceiver; and
accommodate communication between the first wireless transceiver and the second wireless transceiver.

25. The communication circuitry of claim 24, wherein the control circuit is adapted for coupling to computer interface circuitry.

26. The communication circuitry of claim 24, wherein the control circuit is disposed on a module adapted for insertion into a computing device.

27. The communication circuitry of claim 26, comprising a bus interface operational to communicatively couple the control circuit to the first and second wireless transceivers and the wired transceiver.

28. The communication circuitry of claim 27, wherein the bus interface is substantially compliant with a bus standard.

29. The communication circuitry of claim 28, wherein the bus standard is a PCI standard.

30. The communication circuitry of claim 24, where the wired transceiver accommodates communication with an Ethernet network.

31. The communication circuitry of claim 24, where the wired transceiver accommodates communication with a token-ring network.

32. The communication circuitry of claim 24, where the wired transceiver accommodates communication with an asynchronous transfer mode network.

33. The communication circuitry of claim 24, where the wired transceiver accommodates communication with a packetized network.

34. The communication circuitry of claim 24, where the first wireless transceiver supports a substantially non-deterministic media access protocol, and the second wireless transceiver supports a substantially deterministic media access protocol.

35. The communication circuitry of claim 24, where the first wireless transceiver and the second wireless transceiver support substantially distinct non-deterministic media access protocols.

36. The communication circuitry of claim 24, where the first wireless transceiver and the second wireless transceiver operate independently to form a first communication cell and a second communication cell.

37. The communication circuitry of claim 24, wherein the control circuit is further operational to synchronize transmissions on the first wireless communication channel and the second wireless communication channel to minimize conflicts between transmissions on one wireless transceiver and receipts on the other wireless transceiver.

38. The communication circuitry of claim 24, where the wired link is a local area network.

39. The communication circuitry of claim 24, where the first wireless transceiver and the second wireless transceiver have substantially different operating characteristics.

40. Communication circuitry for controlling operation of a communication device having at least a wired transceiver operable to communicate over a wired link, a first wireless transceiver operable to establish a first wireless cell and a second wireless transceiver operable to establish a second wireless cell that substantially overlaps the first wireless cell, said communication circuitry comprising:
a control circuit operational to, at least:
communicatively couple to the wired transceiver;
communicatively couple to the first wireless transceiver;
communicatively couple to the second wireless transceiver;
communicatively couple the first wireless transceiver and the second wireless transceiver to one another; and
accommodate communication between the first wireless transceiver and the wired transceiver.

41. The communication circuitry of claim 40, wherein the control circuit is adapted for coupling to computer interface circuitry.

42. The communication circuitry of claim 40, wherein the control circuit is disposed on a module adapted for insertion into a computing device.

43. The communication circuitry of claim 40, where the first wireless transceiver comprises processing circuitry that supports a first wireless communication protocol, and the second wireless transceiver comprises processing circuitry that supports a second wireless communication protocol different from the first wireless communication protocol.

44. The communication circuitry of claim 40, where the control circuit operates to allow communications between the first wireless transceiver and the second wireless transceiver.

45. The communication circuitry of claim 40, where the first wireless transceiver supports a substantially non-deterministic media access protocol, and the second wireless transceiver supports a substantially deterministic media access protocol.

46. The communication circuitry of claim 40, where the first wireless transceiver and the second wireless transceiver support substantially distinct non-deterministic media access protocols.

47. The communication circuitry of claim 1, where the communication device is an access device.

48. The communication circuitry of claim 17, where the communication device is an access device.

49. The communication circuitry of claim 24, where the communication device is an access device.

50. The communication circuitry of claim 40, where the communication device is an access device.

* * * * *